United States Patent
Moreillon et al.

(10) Patent No.: US 11,267,506 B2
(45) Date of Patent: Mar. 8, 2022

(54) DRIVER TORQUE ESTIMATION APPARATUS AND STEERING SYSTEM INCLUDING THE SAME

(71) Applicant: JTEKT CORPORATION, Osaka (JP)

(72) Inventors: Maxime Moreillon, Nara (JP); Tsutomu Tamura, Nara (JP); Robert Fuchs, Nara (JP); Naoki Shoji, Uda (JP)

(73) Assignee: JTEKT CORPORATION, Osaka (JP)

( * ) Notice: Subject to any disclaimer, the term of this patent is extended or adjusted under 35 U.S.C. 154(b) by 224 days.

(21) Appl. No.: 16/381,048

(22) Filed: Apr. 11, 2019

(65) Prior Publication Data

US 2019/0315398 A1 Oct. 17, 2019

(30) Foreign Application Priority Data

Apr. 17, 2018 (JP) .............................. JP2018-079319
Jul. 17, 2018 (JP) .............................. JP2018-134213

(51) Int. Cl.
*B62D 6/10* (2006.01)
*B62D 5/04* (2006.01)

(52) U.S. Cl.
CPC .............. *B62D 6/10* (2013.01); *B62D 5/0463* (2013.01)

(58) Field of Classification Search
CPC ......... B62D 6/10; B62D 5/0463; B62D 5/046
See application file for complete search history.

(56) References Cited

U.S. PATENT DOCUMENTS

2014/0277944 A1* 9/2014 Bean ...................... B62D 6/002
 701/41
2016/0280267 A1 9/2016 Lavoie et al.
2017/0183032 A1* 6/2017 Wilhelm .................. B62D 6/08

FOREIGN PATENT DOCUMENTS

| DE | 102016219047 A1 | 5/2017 |
| EP | 1623907 A1 | 2/2006 |
| JP | 2009/113512 A | 5/2009 |
| JP | 2017-114324 A | 6/2017 |
| WO | 2013/060896 A1 | 5/2013 |

OTHER PUBLICATIONS

Oct. 23, 2019 extended European Search Report issued in European Patent Application No. 19169296.1.

* cited by examiner

*Primary Examiner* — Yuen Wong
(74) *Attorney, Agent, or Firm* — Oliff PLC

(57) ABSTRACT

An electric power steering system includes a second shaft coupled to a first shaft via a torsion bar, a basic driver torque estimation unit (extended state observer) configured to estimate a basic driver torque by using a disturbance observer based on a torsion bar torque and a rotation angle of the second shaft, a gravity torque calculation unit configured to calculate, by using a rotation angle of a steering wheel, a gravity torque applied to the first shaft by gravity acting on the center of gravity of the steering wheel, and a driver torque estimation unit configured to estimate a driver torque by using the basic driver torque estimated by the basic driver torque estimation unit and the gravity torque calculated by the gravity torque calculation unit.

4 Claims, 18 Drawing Sheets

DRIVER TORQUE ESTIMATION APPARATUS AND STEERING SYSTEM INCLUDING THE SAME

INCORPORATION BY REFERENCE

The disclosure of Japanese Patent Application No. 2018-079319 filed on Apr. 17, 2018 and No. 2018-134213 filed on Jul. 17, 2018 including the specification, drawings and abstract, is incorporated herein by reference in its entirety.

BACKGROUND OF THE INVENTION

1. Field of the Invention

The present invention relates to a driver torque estimation apparatus capable of estimating a driver torque applied to a steering wheel by a driver, and also relates to a steering system including the driver torque estimation apparatus.

2. Description of the Related Art

Japanese Patent Application Publication No. 2017-114324 (JP 2017-114324 A) discloses a steering wheel operation state determination apparatus for a vehicle steering system. The vehicle steering system includes an input shaft, an output shaft, and an electric motor. A steering wheel is coupled to the input shaft. The output shaft is coupled to the input shaft via a torsion bar. The electric motor is coupled to the output shaft via a speed reducer. The steering wheel operation state determination apparatus described in JP 2017-114324 A includes a driver torque estimation unit configured to estimate a driver torque by using a disturbance observer based on a torsion bar torque applied to the torsion bar and a rotation angle of the output shaft.

SUMMARY OF THE INVENTION

It is one object of the present invention to provide a driver torque estimation apparatus capable of estimating a driver torque with high accuracy, and also provide a steering system including the driver torque estimation apparatus.

A driver torque estimation apparatus according to one aspect of the present invention has the following features in its configuration. That is, the driver torque estimation apparatus includes a first shaft, a second shaft, a torque detection unit, a rotation angle acquisition unit, a basic driver torque estimation unit, a gravity torque calculation unit, and a driver torque estimation unit. A steering wheel to be used for steering a vehicle is coupled to the first shaft. The second shaft is coupled to the first shaft via a torsion bar. The torque detection unit is configured to detect a torsion bar torque applied to the torsion bar. The rotation angle acquisition unit is configured to acquire a rotation angle of the second shaft. The basic driver torque estimation unit is configured to estimate a basic driver torque by using a disturbance observer based on the torsion bar torque and the rotation angle of the second shaft. The gravity torque calculation unit is configured to calculate, by using a rotation angle of the steering wheel, a gravity torque applied to the first shaft by gravity acting on a center of gravity of the steering wheel. The driver torque estimation unit is configured to estimate a driver torque by using the basic driver torque estimated by the basic driver torque estimation unit and the gravity torque calculated by the gravity torque calculation unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
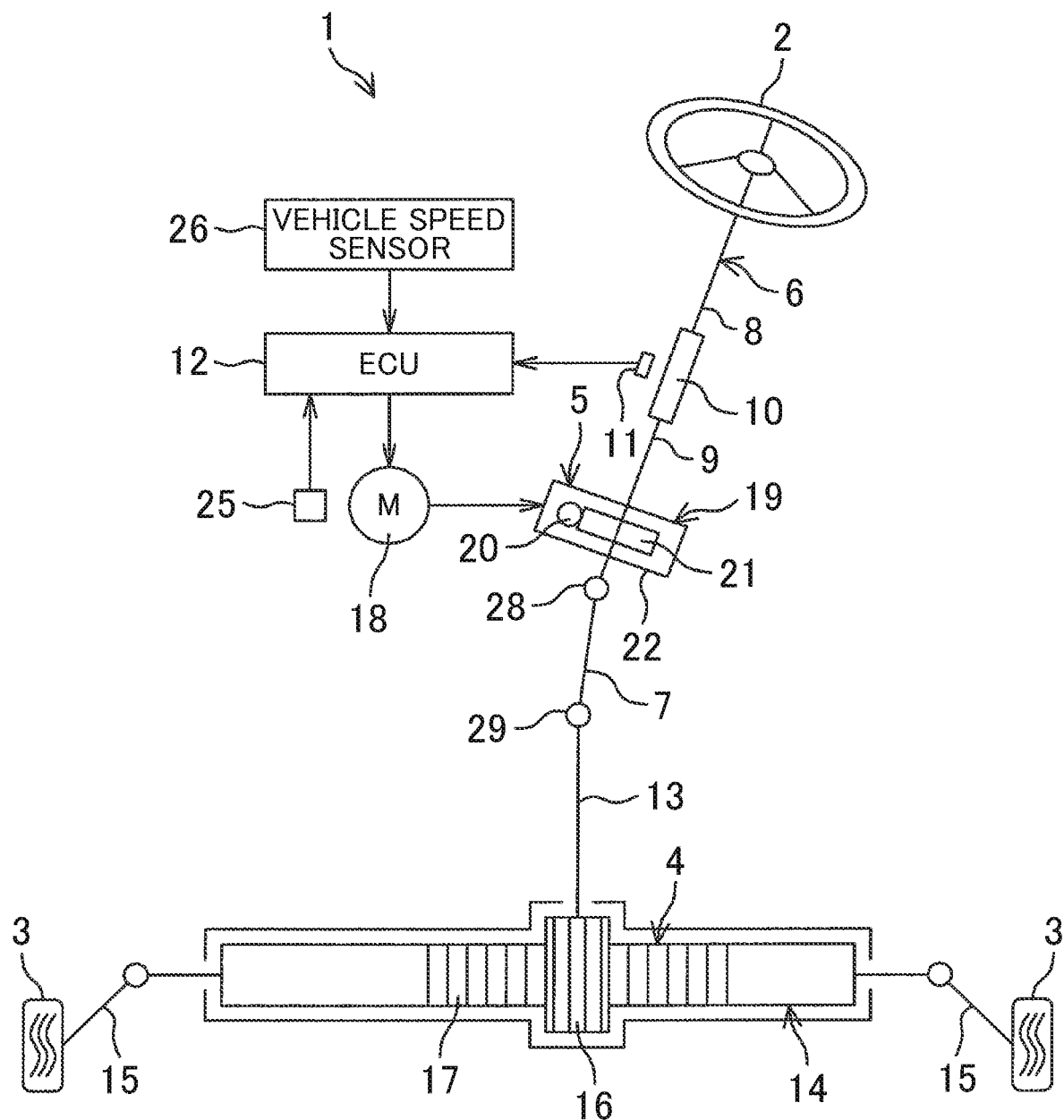
FIG. 1 is a schematic diagram illustrating the overall structure of an electric power steering system (EPS) to which a driver torque estimation apparatus according to one embodiment of the present invention is applied.

First, a first embodiment of the present invention is described. FIG. 1 is a schematic diagram illustrating the overall structure of an electric power steering system to which a driver torque estimation apparatus according to one embodiment of the present invention is applied. An electric power steering system (vehicle steering system) 1 is a column assist type electric power steering system (hereinafter referred to as "column type EPS") in which an electric motor and a speed reducer are arranged on a column unit.

The column type EPS 1 includes a steering wheel 2, a steering operation mechanism 4, and a steering assist mechanism 5. The steering wheel 2 is a steering member to be used for steering a vehicle. The steering operation mechanism 4 turns steered wheels 3 in association with rotation of the steering wheel 2. The steering assist mechanism 5 assists a driver's steering operation. The steering wheel 2 and the steering operation mechanism 4 are mechanically coupled together via a steering shaft 6, a first universal joint 28, an intermediate shaft 7, and a second universal joint 29.

The steering shaft 6 includes a first shaft 8 and a second shaft 9. The first shaft 8 is coupled to the steering wheel 2. The second shaft 9 is coupled to the intermediate shaft 7 via the first universal joint 28. The first shaft 8 and the second shaft 9 are coupled together via a torsion bar 10 so as to be rotatable relative to each other. A torque sensor 11 is provided on the periphery of the steering shaft 6. The torque sensor 11 detects a torsion bar torque $T_{tb}$ applied to the torsion bar 10 based on a relative rotation displacement amount between the first shaft 8 and the second shaft 9. The torsion bar torque $T_{tb}$ detected by the torque sensor 11 is input to an electronic control unit (ECU) 12.

The steering operation mechanism 4 is a rack and pinion mechanism including a pinion shaft 13 and a rack shaft 14 serving as a steering operation shaft. The steered wheels 3 are coupled to the ends of the rack shaft 14 via tie rods 15 and knuckle arms (not illustrated), respectively. The pinion shaft 13 is coupled to the intermediate shaft 7 via the second universal joint 29. A pinion 16 is coupled to the distal end of the pinion shaft 13.

The rack shaft 14 linearly extends along a lateral direction of the vehicle. A rack 17 is formed in the middle of the rack shaft 14 in its axial direction. The rack 17 meshes with the pinion 16. The pinion 16 and the rack 17 convert rotation of the pinion shaft 13 to axial movement of the rack shaft 14. Through the axial movement of the rack shaft 14, the steered wheels 3 can be turned.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 to the axial movement of the rack shaft 14. Thus, the steered wheels 3 are turned. The steering assist mechanism 5 includes an electric motor 18 and a speed reducer 19. The electric motor 18 generates a steering assist force. The speed reducer 19 amplifies a torque output from the electric motor 18, and transmits the torque to the steering operation mechanism 4. In this embodiment, the electric motor 18 is a three-phase brushless motor. The speed reducer 19 is constituted by a worm gear mechanism including a worm gear 20 and a worm wheel 21 that meshes with the worm gear 20. The speed reducer 19 is housed in a gear housing 22. A speed reducing ratio (gear ratio) of the speed reducer 19 may hereinafter be represented by "N". The speed reducing ratio N is defined as a ratio $\omega_{wg}/\omega_{ww}$ of an angular velocity $\omega_{wg}$ of the worm gear 20 to an angular velocity $\omega_{ww}$ of the worm wheel 21.

The worm gear 20 is driven to rotate by the electric motor 18. The worm wheel 21 is coupled to the second shaft 9 so as to be rotatable together with the second shaft 9. The worm wheel 21 is driven to rotate by the worm gear 20. The electric motor 18 is driven depending on a driver's steering state, and the worm gear 20 is driven to rotate by the electric motor 18. Thus, the worm wheel 21 is driven to rotate, thereby applying the motor torque to the steering shaft 6 and rotating the steering shaft 6 (second shaft 9). The rotation of the steering shaft 6 is transmitted to the pinion shaft 13 via the intermediate shaft 7. The rotation of the pinion shaft 13 is converted to the axial movement of the rack shaft 14. Thus, the steered wheels 3 are turned. That is, when the worm gear 20 is driven to rotate by the electric motor 18, the steering can be assisted by the electric motor 18.

Figure 2:
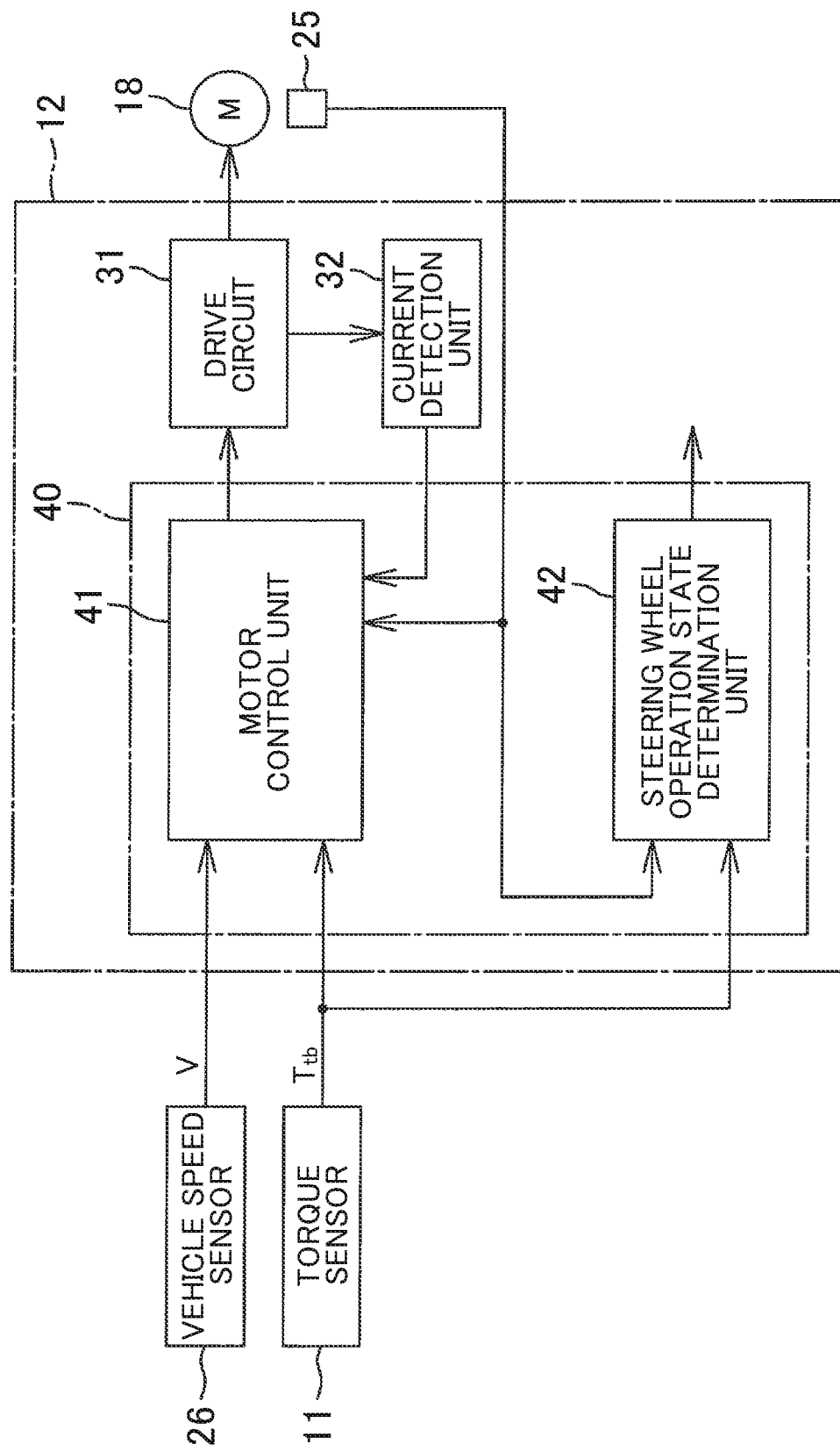
FIG. 2 is a block diagram illustrating the electrical configuration of an electronic control unit (ECU)

A rotation angle of a rotor of the electric motor 18 is detected by a rotation angle sensor 25 such as a resolver. A vehicle speed V is detected by a vehicle speed sensor 26. A signal output from the rotation angle sensor 25 and the vehicle speed V detected by the vehicle speed sensor 26 are input to the ECU 12. The electric motor 18 is controlled by the ECU 12. FIG. 2 is a schematic diagram illustrating the electrical configuration of the ECU 12.

The ECU 12 includes a microcomputer 40, a drive circuit (three-phase inverter circuit) 31, and a current detection unit 32. The drive circuit 31 is controlled by the microcomputer 40, and supplies electric power to the electric motor 18. The current detection unit 32 detects a current flowing through the electric motor 18 (hereinafter referred to as "motor current"). The microcomputer 40 includes a central processing unit (CPU) and memories (such as a read-only memory (ROM), a random-access memory (RAM), and a non-volatile memory), and functions as a plurality of functional processing units by executing a predetermined program. The functional processing units include a motor control unit 41 and a steering wheel operation state determination unit 42.

The motor control unit 41 controls driving of the drive circuit 31 based on the vehicle speed V, the torsion bar torque $T_{tb}$, the rotor rotation angle, and the motor current, thereby achieving appropriate steering assist depending on steering conditions. The vehicle speed V is detected by the vehicle speed sensor 26. The torsion bar torque $T_{tb}$ is detected by the torque sensor 11. The rotor rotation angle is calculated based on an output from the rotation angle sensor 25. The motor current is detected by the current detection unit 32. Specifically, the motor control unit 41 sets a current command value based on the torsion bar torque $T_{tb}$ and the vehicle speed V. The current command value is a target value of the motor current flowing through the electric motor 18. The current command value corresponds to a target value of the steering assist force (assist torque) depending on the steering conditions. The motor control unit 41 controls the driving of the drive circuit 31 so that the motor current detected by the current detection unit 32 approaches the current command value.

Figure 3:
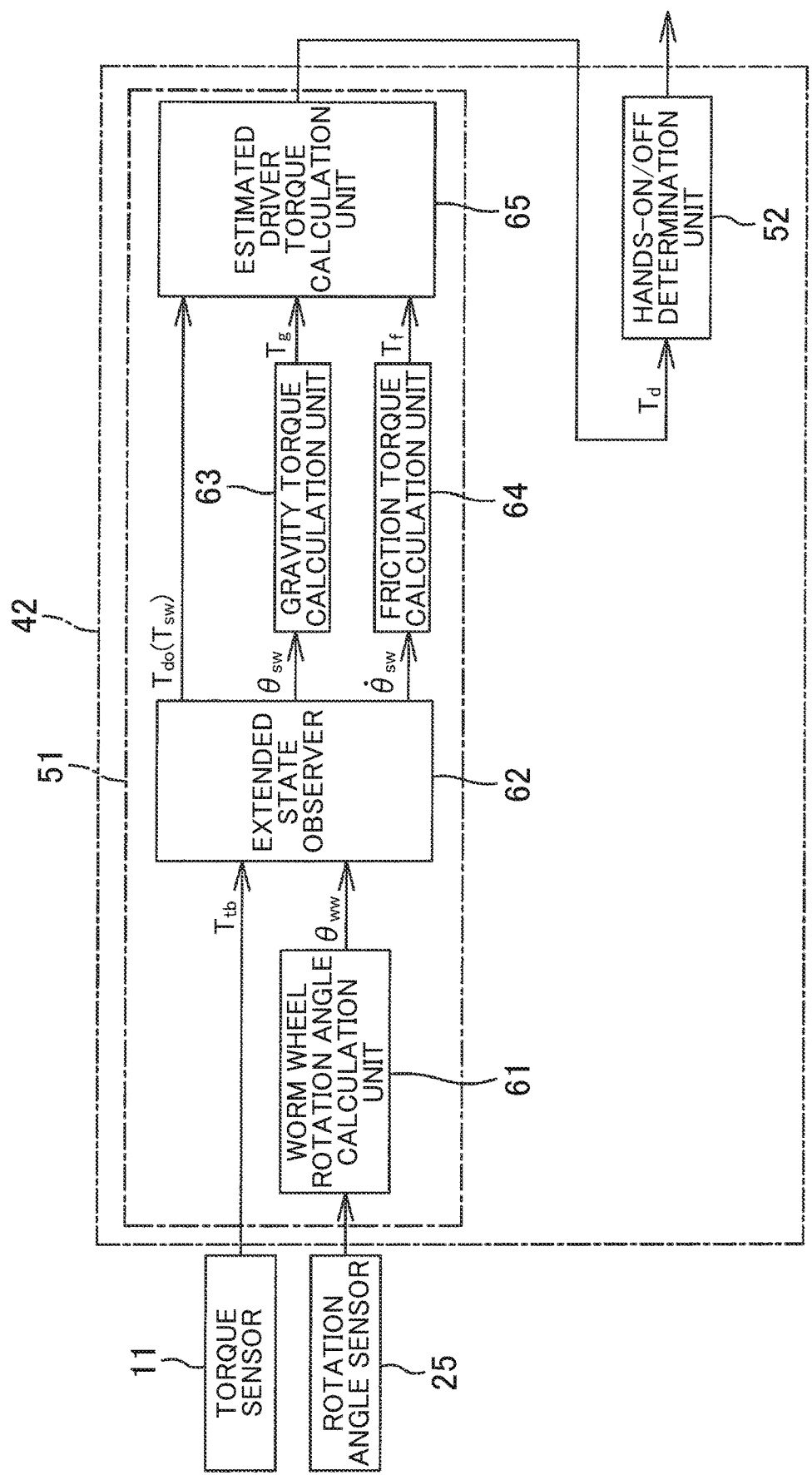
FIG. 3 is a block diagram illustrating the electrical configuration of a steering wheel operation state determination unit.

The steering wheel operation state determination unit 42 determines whether a steering wheel operation state is a hands-on state or a hands-off state based on the torsion bar torque $T_{tb}$ and the rotor rotation angle. In the hands-on state, the driver is gripping the steering wheel 2. In the hands-off state, the driver is not gripping the steering wheel 2. The torsion bar torque $T_{tb}$ is detected by the torque sensor 11. The rotor rotation angle is calculated based on the output from the rotation angle sensor 25. FIG. 3 is a block diagram illustrating the electrical configuration of the steering wheel operation state determination unit 42.

The steering wheel operation state determination unit 42 includes a driver torque estimation unit 51 and a hands-on/off determination unit 52. The driver torque estimation unit 51 estimates a driver torque $T_d$ based on the signal output from the rotation angle sensor 25 and the torsion bar torque $T_{tb}$ detected by the torque sensor 11. The hands-on/off determination unit 52 determines whether the steering wheel operation state is the hands-on state or the hands-off state based on the driver torque $T_d$ estimated by the driver torque estimation unit 51 (estimated driver torque).

First, the driver torque estimation unit 51 is described. The torsion bar torque $T_{tb}$ is represented by Expression (1).

$$T_{tb} = T_d - J_{sw} \cdot d^2\theta_{sw}/dt^2 + T_c + T_g + T_f \tag{1}$$

$J_{sw}$: steering wheel inertia
$\theta_{sw}$: steering wheel rotation angle $d^2\theta_{sw}/dt^2$: steering wheel angular acceleration $J_{sw} \cdot d^2\theta_{sw}/dt^2$: steering wheel inertia torque $T_c$: viscous friction torque acting on steering wheel 2

$T_g$: gravity torque applied to first shaft 8 by gravity acting on center of gravity of steering wheel 2

$T_f$: Coulomb friction torque acting on first shaft 8 and steering wheel 2

In this embodiment, the positive or negative signs of the torsion bar torque $T_{tb}$ and the driver torque $T_d$ are positive in a case of a torque in a leftward steering direction, and are negative in a case of a torque in a rightward steering direction. The steering wheel rotation angle $\theta_{sw}$ indicates the amount of forward or backward rotation from the neutral position of the steering wheel 2. In this embodiment, the amount of leftward rotation from the neutral position is a positive value, and the amount of rightward rotation from the neutral position is a negative value.

The viscous friction torque T and the Coulomb friction torque $T_f$ act in a direction opposite to a direction of a steering wheel angular velocity $d\theta_{sw}/dt$. Therefore, the positive or negative signs of the viscous friction torque $T_c$ and the Coulomb friction torque $T_f$ are opposite to the positive or negative sign of the steering wheel angular velocity $d\theta_{sw}/dt$. The viscous friction torque $T_c$ may be represented by $T_c = -C_{sw} \cdot d\theta_{sw}/dt$, where "$C_{sw}$" represents a steering wheel viscosity. The positive or negative sign of the gravity torque $T_g$ may be identical or opposite to the positive or negative sign of the driver torque $T_d$ depending on the steering wheel rotation angle $\theta_{sw}$.

Based on Expression (1), the driver torque $T_d$ is represented by Expression (2).

$$T_d = T_{tb} + J_{sw} \cdot d^2\theta_{sw}/dt^2 - T_c - T_g - T_f = T_{do} - T_g - T_f \quad (2)$$

In Expression (2), $T_{do} = T_{tb} + J_{sw} \cdot d^2\theta_{sw}/dt^2 - T_c$. The symbol "$T_{do}$" represents a driver torque determined in consideration of the steering wheel inertia torque $J_{sw} \cdot d^2\theta_{sw}/dt^2$ and the viscous friction torque $T_c$ but not in consideration of the gravity torque $T_g$ and the Coulomb friction torque $T_f$. The driver torque $T_{do}$ is an example of a basic driver torque of the present invention. In this embodiment, the driver torque $T_d$, represented by $T_{do} = T_{tb} + J_{sw} \cdot d^2\theta_{sw}/dt^2 - T$ may be referred to as the basic driver torque.

The driver torque estimation unit 51 includes a worm wheel rotation angle calculation unit 61, an extended state observer (disturbance observer) 62, a gravity torque calculation unit 63, a friction torque calculation unit 64, and an estimated driver torque calculation unit 65. The worm wheel rotation angle calculation unit 61 calculates a rotation angle of an output shaft of the electric motor 18 (hereinafter referred to as "rotor rotation angle $\theta_m$") based on the signal output from the rotation angle sensor 25. The worm wheel rotation angle calculation unit 61 calculates a rotation angle of the worm wheel 21 (hereinafter referred to as "worm wheel rotation angle $\theta_{ww}$") based on the obtained rotor rotation angle $\theta_m$. Specifically, the worm wheel rotation angle calculation unit 61 calculates the worm wheel rotation angle $\theta_{ww}$ by dividing the rotor rotation angle $\theta_m$ by the speed reducing ratio N of the speed reducer 19.

The extended state observer 62 estimates the basic driver torque $T_{do}$, the steering wheel rotation angle $\theta_{sw}$, and the steering wheel angular velocity $d\theta_{sw}/dt$ based on the worm wheel rotation angle $\theta_{ww}$ and the torsion bar torque $T_{tb}$. The worm wheel rotation angle $\theta_{ww}$ is calculated by the worm wheel rotation angle calculation unit 61. The torsion bar torque $T_{tb}$ is detected by the torque sensor 11. The extended state observer 62 estimates the basic driver torque $T_{do}$, the steering wheel rotation angle $\theta_{sw}$, and the steering wheel angular velocity $d\theta_{sw}/dt$ by using a physical model of the column type EPS.

Figure 4:
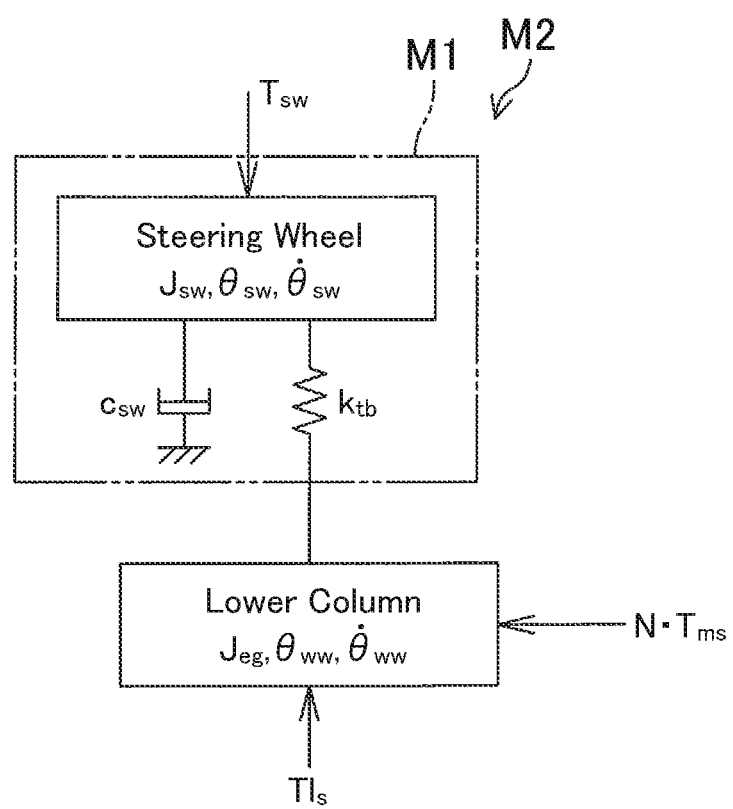
FIG. 4 is a schematic diagram illustrating the configuration of a physical model of a column type EPS.

FIG. 4 is a schematic diagram illustrating the configuration of the physical model of the column type EPS. FIG. 4 as a whole illustrates a dual inertia system model M2 of the column type EPS. A portion indicated by a long dashed double-short dashed line in FIG. 4 represents a single inertia system model M1 of the column type EPS. The single inertia system model M1 includes the steering wheel. A driver torque $T_{sw}$ is input to the steering wheel.

The dual inertia system model M2 includes the steering wheel and a lower column. The lower column includes an assist motor, the worm gear, and the worm wheel. The worm gear and the worm wheel constitute the speed reducer. The driver torque $T_{sw}$ is input to the steering wheel. A torque corresponding to a value $N \cdot T_{ms}$ and a load torque $T_{ls}$ are input to the lower column. The value $N \cdot T_{ms}$ is obtained by multiplying the motor torque $T_{ms}$ by the speed reducing ratio N of the speed reducer. The load torque $T_{ls}$ is applied to the lower column from the steered wheels.

The symbols in FIG. 4 represent the following elements.

$J_{sw}$: steering wheel inertia $T_{sw}$: driver torque $T_{tb}$: torsion bar torque $k_{tb}$: torsion bar rigidity $c_{sw}$: steering wheel viscosity N: speed reducing ratio $\theta_{sw}$: steering wheel rotation angle $d\theta_{sw}/dt$: steering wheel angular velocity $J_{eg}$: lower column inertia $\theta_{ww}$: worm wheel rotation angle $d\theta_{ww}/dt$: worm wheel angular velocity $T_{ls}$: load torque (reverse input torque)

In this embodiment, the extended state observer 62 uses the single inertia system model M1, and estimates the driver torque $T_{sw}$ by using an extended disturbance state observer (disturbance observer). As described later, the driver torque $T_{sw}$ estimated by the extended state observer 62 corresponds to the basic driver torque $T_{do}$ described above.

An equation of motion of the single inertia system model M1 in terms of the steering wheel inertia is represented by Expression (3).

$$J_{sw}\ddot{\theta}_{sw} = T_{sw} - k_{tb}(\theta_{sw} - \theta_{ww}) - c_{sw} \cdot \dot{\theta}_{sw} \quad (3)$$

The symbol "$d^2\theta_{sw}/dt^2$" represents the angular acceleration of the steering wheel. In Expression (3), $k_{tb}(\theta_{sw} - \theta_{ww})$ corresponds to the torsion bar torque $T_{tb}$ of Expression (1), and $c_{sw} \cdot (d\theta_{sw}/dt)$ corresponds to the viscous friction torque $T_{do}$ of Expression (1). The driver torque $T_{sw}$ of Expression (3) corresponds to the driver torque $T_{do}$ of Expression (2).

Equations of state of the single inertia system model M1 may be represented by Expression (4).

$$\begin{cases} \dot{\hat{X}}_e = A_e \hat{X}_e + B_e u1 + L_e(y - \hat{y}) \\ \hat{y} = C_e \hat{X}_e + D_e u1 \end{cases} \quad (4)$$

In Expression (4), "$\hat{x}_e$" represents a state variable vector, which is represented by Expression (5).

$$\hat{x}_e = \begin{bmatrix} \theta_{sw} \\ \dot{\theta}_{sw} \\ T_{sw} \end{bmatrix} \quad (5)$$

In Expression (4), "$u_1$" represents an input vector, which is represented by Expression (6).

$$u_1 = \theta_{ww} \quad (6)$$

In Expression (4), "y" represents an output vector (measured value), which is represented by Expression (7). In Expression (4), "ŷ" represents an output vector estimation value.

$$y = T_{tb} = k_{tb}(\theta_{sw} - \theta_{ww}) \quad (7)$$

In Expression (4), "$A_e$" represents a system matrix, which is represented by Expression (8).

$$A_e = \begin{bmatrix} 0 & 1 & 0 \\ \frac{-k_{tb}}{J_{sw}} & \frac{-c_{sw}}{J_{sw}} & \frac{1}{J_{sw}} \\ 0 & 0 & 0 \end{bmatrix} \quad (8)$$

In Expression (4), "$B_e$" represents an input matrix, which is represented by Expression (9).

$$B_e \begin{bmatrix} 0 \\ \frac{k_{tb}}{J_{sw}} \\ 0 \end{bmatrix} \quad (9)$$

In Expression (4), "$L_e$" represents an observer gain matrix, which is represented by Expression (10).

$$L_e = \begin{bmatrix} L_1 \\ L_2 \\ L_3 \end{bmatrix} \quad (10)$$

In Expression (10), "$L_1$", "$L_2$", and "$L_3$" represent first, second, and third observer gains, respectively, which are set in advance. In Expression (4), "$C_e$" represents an output matrix, which is represented by Expression (11).

$$C_e = [k_{tb} \ O \ O] \quad (11)$$

In Expression (4), "$D_e$" represents a feedthrough matrix, which is represented by Expression (12).

$$D_e = -k_{tb} \quad (12)$$

The extended state observer 62 calculates the state variable vector $\hat{x}_e$ based on the equations of state represented by Expression (4). Thus, the basic driver torque $T_{do}$ (=$T_{sw}$) is obtained.

Figure 5:
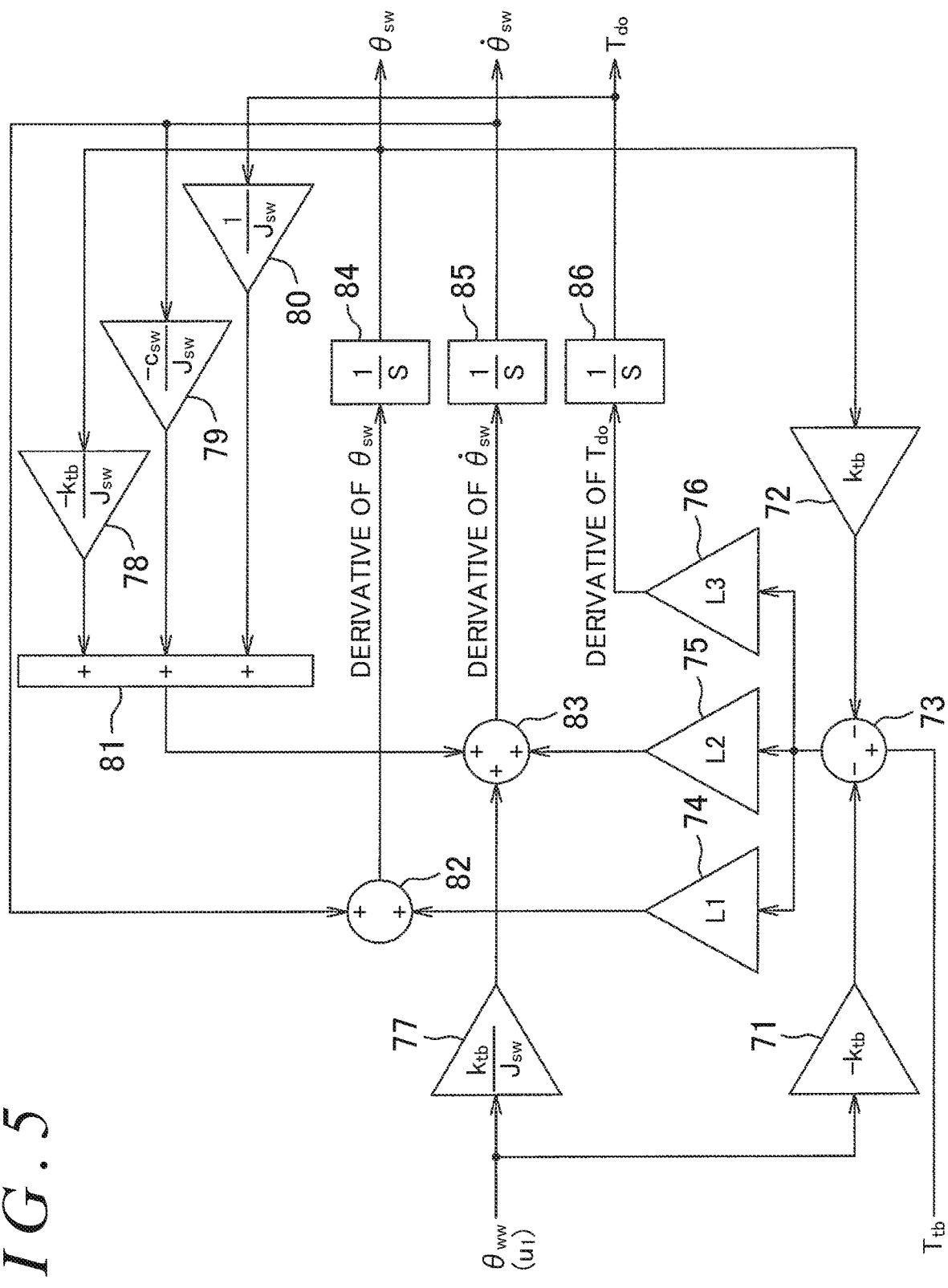
FIG. 5 is a block diagram illustrating the configuration of an extended state observer.

FIG. 5 is a block diagram illustrating the configuration of the extended state observer 62. The extended state observer 62 includes a $D_e$ multiplier 71, a $C_e$ multiplier 72, a first adder 73, an $L_1$ multiplier 74, an $L_2$ multiplier 75, an $L_3$ multiplier 76, and a $B_e$ multiplier 77. The extended state observer 62 further includes a $-k_{tb}/J_{sw}$ multiplier 78, a $-c_{sw}/J_{sw}$ multiplier 79, a $1/J_{sw}$ multiplier 80, a second adder 81, a third adder 82, a fourth adder 83, a first integrator 84, a second integrator 85, and a third integrator 86.

The worm wheel rotation angle $\theta_{ww}$ (corresponding to the input vector $u_1$) calculated by the worm wheel rotation angle calculation unit 61 is supplied to the $D_e$ multiplier 71 and to the $B_e$ multiplier 77. Outputs from the first integrator 84, the second integrator 85, and the third integrator 86 correspond to the steering wheel rotation angle $\theta_{sw}$, the steering wheel angular velocity $d\theta_{sw}/dt$, and the basic driver torque IT, (=$T_{do}$) included in the state variable vector $\hat{x}_e$ (see Expression (5)), respectively. At the start of calculation, initial values are given as $\theta_{sw}$, $d\theta_{sw}/dt$, and $T_{sw}$. For example, the initial values of $\theta_{sw}$, $d\theta_{sw}/dt$, and $T_{sw}$ are 0.

The $-k_{tb}/J_{sw}$ multiplier 78 multiplies $\theta_{sw}$ by $-k_{tb}/J_{sw}$. The $-c_{sw}/J_{sw}$ multiplier 79 multiplies $d\theta_{sw}/dt$ by $-c_{sw}/J_{sw}$. The $1/J_{sw}$ multiplier 80 multiplies $T_{do}$ ($T_{sw}$) by $1/J_{sw}$. The second adder 81 adds multiplication results of the three multipliers 78, 79, and 80 together. The Cc multiplier 72 multiplies $\theta_{sw}$ by $k_{tb}$. That is, the $C_e$ multiplier 72 calculates $C_e \cdot \hat{x}_e$ of Expression (4). The $D_e$ multiplier 71 multiplies the worm wheel rotation angle $\theta_{ww}$ calculated by the worm wheel rotation angle calculation unit 61 by $-k_{tb}$. That is, the $C_e$ multiplier 72 calculates $D_e \cdot u_1$ of Expression (4).

The first adder 73 subtracts the output from the $C_e$ multiplier 72 ($C_e \cdot \hat{x}_e$) and the output from the $D_e$ multiplier 71 ($D_e \cdot u_1$) from the output vector (measured value) y corresponding to the torsion bar torque $T_{tb}$ detected by the torque sensor 11. That is, the first adder 73 calculates the difference (y−ŷ) between the output vector y and the output vector estimation value ŷ (=$C_e \cdot \hat{x}_e + D_e \cdot u_1$).

The $L_1$ multiplier 74 multiplies the output from the first adder 73 (y−ŷ) by the first observer gain $L_1$ (see Expression (10)). The $L_2$ multiplier 75 multiplies the output from the first adder 73 (y−ŷ) by the second observer gain $L_2$. The $L_3$ multiplier 76 calculates a derivative of the basic driver torque $T_{sw}$ (=$T_{do}$) by multiplying the output from the first adder 73 (y−ŷ) by the third observer gain $L_3$.

The $B_e$ multiplier 77 multiplies the worm wheel rotation angle $\theta_{ww}$ calculated by the worm wheel rotation angle calculation unit 61 by $k_{tb}/J_{sw}$. That is, the $B_e$ multiplier 77 calculates $B_e \cdot u_1$ of Expression (4). The third adder 82 calculates a derivative of the steering wheel rotation angle $\theta_{sw}$ by adding $d\theta_{sw}/dt$ to the output from the $L_1$ multiplier 74 ($L_1 \cdot (y-\hat{y})$). The first integrator 84 calculates the steering wheel rotation angle $\theta_{sw}$ by integrating the derivative of $\theta_{sw}$.

The fourth adder 83 adds the output from the $B_e$ multiplier 77 and the output from the second adder 81 to the output from the $L_2$ multiplier 75 ($L_2 \cdot (y-\hat{y})$). Thus, a derivative of the steering wheel angular velocity $d\theta_{sw}/dt$ is calculated. The second integrator 85 calculates the steering wheel angular velocity $d\theta_{sw}/dt$ by integrating the derivative of $d\theta_{sw}/dt$. The third integrator 86 calculates the basic driver torque $T_{sw}$ (=$T_{do}$) by integrating the output from the $L_3$ multiplier 76 ($L_3 \cdot (y-\hat{y})$).

Referring back to FIG. 3, the steering wheel rotation angle $\theta_{sw}$ calculated by the extended state observer 62 is supplied to the gravity torque calculation unit 63. The steering wheel angular velocity $d\theta_{sw}/dt$ calculated by the extended state observer 62 is supplied to the friction torque calculation unit 64. The basic driver torque $T_{do}$ calculated by the extended state observer 62 is supplied to the estimated driver torque calculation unit 65.

Figure 6A:
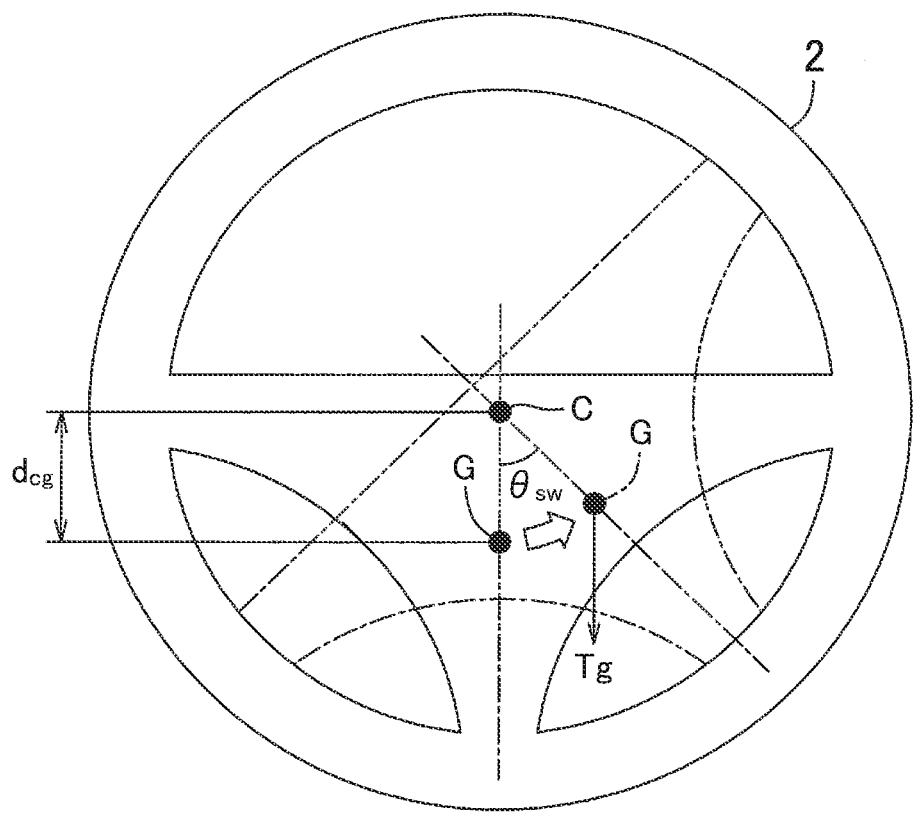
FIG. 6A is a schematic front elevation illustrating a center-of-gravity position of a steering wheel and a central axis of a first shaft.

The gravity torque calculation unit 63 calculates the gravity torque $T_g$ based on the steering wheel rotation angle $\theta_{sw}$ estimated by the extended state observer 62. The gravity torque $T_g$ is applied to the first shaft 8 by the gravity acting on the center of gravity of the steering wheel 2. As illustrated in FIG. 6A, a center-of-gravity position G and a center-of-rotation position C (intersection of a rotational plane of the steering wheel 2 and a central axis of the first shaft 8) do not coincide with each other in the rotational plane of the steering wheel 2. A distance between the center-of-gravity position G and the center-of-rotation position C in the rotational plane of the steering wheel 2 is referred to as an offset distance $d_{cg}$. The mass of the steering wheel 2 is represented by "m", and a gravitational acceleration is represented by "$g_{cg}$".

Long dashed short dashed lines in FIG. 6A indicate a state in which the steering wheel 2 rotates counterclockwise by $\theta_{sw}$ from the neutral position. In this state, the gravity torque $T_g$ is applied to the center of gravity G of the steering wheel 2. In the case of this embodiment, the steering wheel 2 is likely to return to the neutral position. This demonstrates that the driver torque estimation may involve deviation in the driver torque estimation value if no consideration is made for the influence of the gravity torque.

Figure 6B:
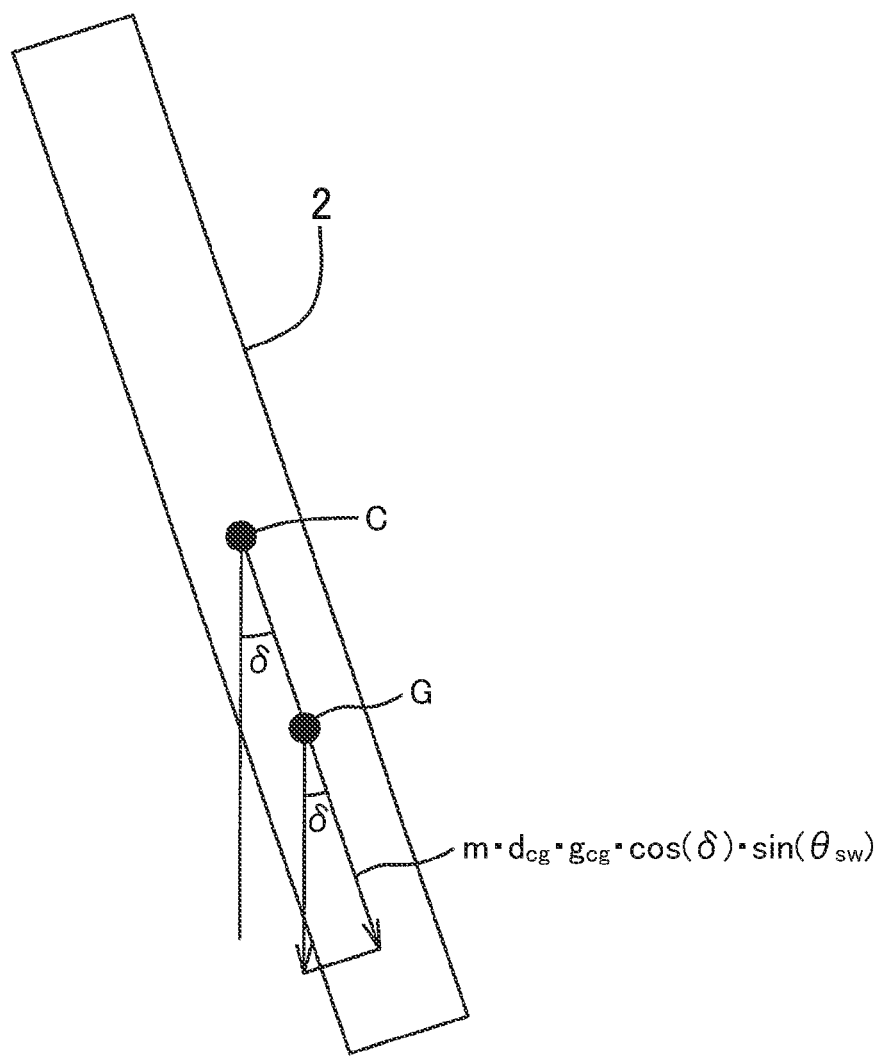
FIG. 6B is a schematic side elevation of FIG. 6A.

As illustrated in FIG. 6B, an angle formed by a vertical line passing through the center-of-rotation position C (or the center-of-gravity position G) of the steering wheel 2 with respect to the rotational plane of the steering wheel 2 in a state in which the steering wheel 2 is mounted on the vehicle is defined as a steering wheel inclination angle δ. The gravity torque $T_g$ is applied to the first shaft 8 by a gravity $m \cdot g_{cg}$ acting on the center of gravity G of the steering wheel 2.

The gravity torque calculation unit 63 calculates the gravity torque $T_g$ based on Expression (13).

$$T_g = -G_{gr} \cdot \sin(\theta_{sw}) \quad (13)$$

The symbol "$G_{gr}$" represents a gravity torque coefficient, which is a value determined based on a product $m \cdot g_{cg} \cdot d_{cg} \cdot \cos(\delta)$ that is a product of the mass m of the steering wheel 2, the gravitational acceleration $g_{cg}$, the offset distance $d_{cg}$, and a cosine value $\cos(\delta)$ of the steering wheel inclination angle δ. The symbol "$\sin(\theta_{sw})$" represents a sine value of the steering wheel rotation angle $\theta_{sw}$.

If the offset distance $d_{cg}$, the mass m of the steering wheel 2, and the steering wheel inclination angle δ are known, the gravity torque coefficient $G_{gr}$ can be determined based on an expression of $G_{gr} = m \cdot d_{cg} \cdot g_{cg} \cdot \cos(\delta)$. Alternatively, the gravity torque coefficient $G_{gr}$ may be determined as follows. That is, a steady-state torsion bar torque $T_{tb}$ is measured by using a steering wheel rotation angle $\theta_{sw}$ in the hands-off state as a parameter. The absolute value of a torsion bar torque $T_{tb}$ when the steering wheel rotation angle $\theta_{sw}$ is 90° is determined as the gravity torque coefficient $G_{gr}$.

Figure 7:
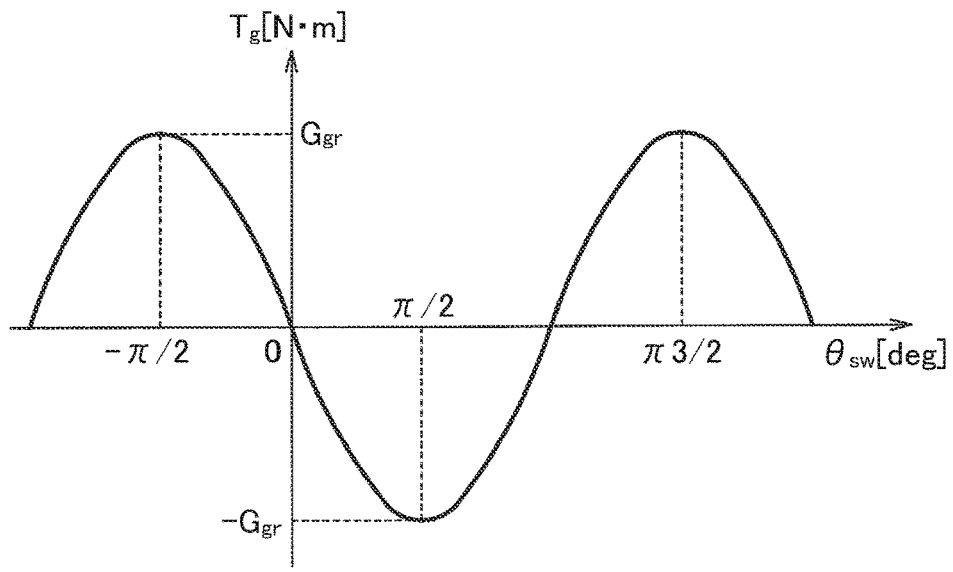
FIG. 7 is a graph illustrating an example of a relationship between a steering wheel rotation angle $\theta_{sw}$ and a gravity torque $T_g$.

FIG. 7 illustrates an example of a relationship between the steering wheel rotation angle $\theta_{sw}$ and the gravity torque $T_g$. The gravity $m \cdot g_{cg}$ acting on the center of gravity of the steering wheel 2 is a vertical force. Therefore, its absolute value is maximum when the steering wheel rotation angle $\theta_{sw}$ is ±90 [deg] and ±270 [deg]. Referring back to FIG. 3, the friction torque calculation unit 64 calculates the Coulomb friction torque $T_f$ based on the steering wheel angular velocity $d\theta_{sw}/dt$ estimated by the extended state observer 62.

The Coulomb friction torque $T_f$ acts on the first shaft 8 and the steering wheel 2. The Coulomb friction torque $T_f$ is generated in, for example, a bearing that supports the first shaft 8. The friction torque calculation unit 64 calculates the Coulomb friction torque $T_f$ based on Expression (14).

$$T_f = -G_f \tanh(\eta \cdot LPF(d\theta_{sw}/dt)) \quad (14)$$

$G_f$: Coulomb friction torque coefficient

η: Coulomb friction torque change gradient (absolute value)

$LPF(d\theta_{sw}/dt)$: value obtained by subjecting steering wheel angular velocity $d\theta_{sw}/dt$ to filtering of first-order lag system (hereinafter referred to as "filtered steering wheel angular velocity $LPF(d\theta_{sw}/dt)$")

The Coulomb friction torque coefficient $G_f$ can be determined as follows. In the hands-off state, the motor torque to be applied to the second shaft 9 by the electric motor 18 is gradually increased, and the absolute value of a torsion bar torque $T_{tb}$ when the absolute value of the steering wheel angular velocity $d\theta_{sw}/dt$ is larger than 0, that is, when the steering wheel 2 starts to move is determined as the Coulomb friction torque coefficient $G_f$. The Coulomb friction torque change gradient η is determined by tuning.

Figure 8:
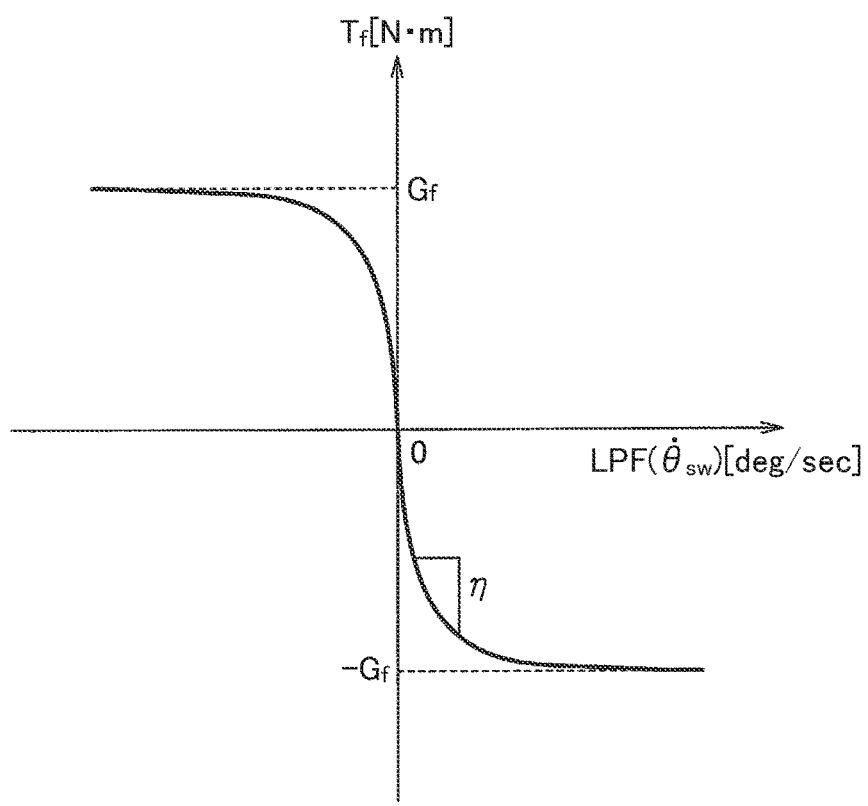
FIG. 8 is a graph illustrating an example of a relationship between a filtered steering wheel angular velocity $LPF(d\theta_{sw}/dt)$ and a Coulomb friction torque $T_f$.

FIG. 8 illustrates an example of a relationship between the filtered steering wheel angular velocity $LPF(d\theta_{sw}/dt)$ and the Coulomb friction torque $T_f$. The Coulomb friction torque $T_f$ takes a negative value when the filtered steering wheel angular velocity $LPF(d\theta_{sw}/dt)$ is positive. The Coulomb friction torque $T_f$ takes a positive value when the filtered steering wheel angular velocity $LPF(d\theta_{sw}/dt)$ is negative. When the absolute value of the filtered steering wheel angular velocity $LPF(d\theta_{sw}/dt)$ increases from 0, the absolute value of the Coulomb friction torque $T_f$ increases at a relatively high change rate within a range in which the absolute value of $LPF(d\theta_{sw}/dt)$ is small. Then, the absolute value of the Coulomb friction torque $T_f$ converges on the magnitude of the Coulomb friction torque coefficient $G_f$. The change rate of the Coulomb friction torque $T_f$ with respect to the filtered steering wheel angular velocity $LPF(d\theta_{sw}/dt)$ within the range in which the absolute value of $LPF(d\theta_{sw}/dt)$ is small increases as the Coulomb friction torque change gradient η increases.

Figure 9:
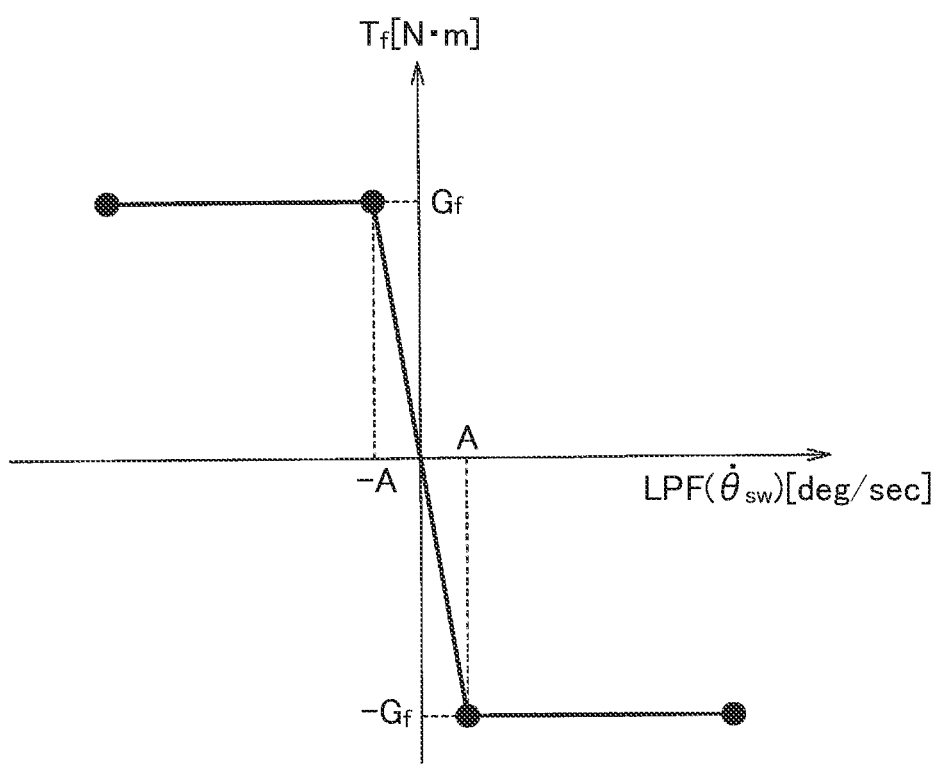
FIG. 9 is a graph illustrating another example of the relationship between the filtered steering wheel angular velocity $LPF(d\theta_{sw}/dt)$ and the Coulomb friction torque $T_f$.

A map indicating a relationship between the filtered steering wheel angular velocity $LPF(d\theta_{sw}/dt)$ and the Coulomb friction torque $T_f$ may be created in advance, and the Coulomb friction torque $T_f$ may be calculated based on the map. In this case, the relationship between the filtered steering wheel angular velocity $LPF(d\theta_{sw}/dt)$ and the Coulomb friction torque $T_f$ may be a relationship illustrated in FIG. 9. In this example, the Coulomb friction torque $T_f$ takes a value of $+G_f$ within a range in which the filtered steering wheel angular velocity $LPF(d\theta_{sw}/dt)$ is equal to or smaller than −A. The Coulomb friction torque $T_f$ takes a value of $-G_f$ within a range in which the filtered steering wheel angular velocity $LPF(d\theta_{sw}/dt)$ is equal to or larger than +A. Within a range in which $LPF(d\theta_{sw}/dt)$ is larger than −A and smaller than +A, the Coulomb friction torque $T_f$ linearly changes from $+G_f$ to $-G_f$ as the steering wheel angular velocity $d\theta_{sw}/dt$ increases.

Referring back to FIG. 3, the estimated driver torque calculation unit 65 calculates the driver torque (driver torque estimation value) $T_d$ by substituting the basic driver torque $T_{do}$ ($=T_{sw}$) estimated by the extended state observer 62, the gravity torque $T_g$ calculated by the gravity torque calculation unit 63, and the Coulomb friction torque $T_f$ calculated by the friction torque calculation unit 64 into Expression (2).

Figure 10:
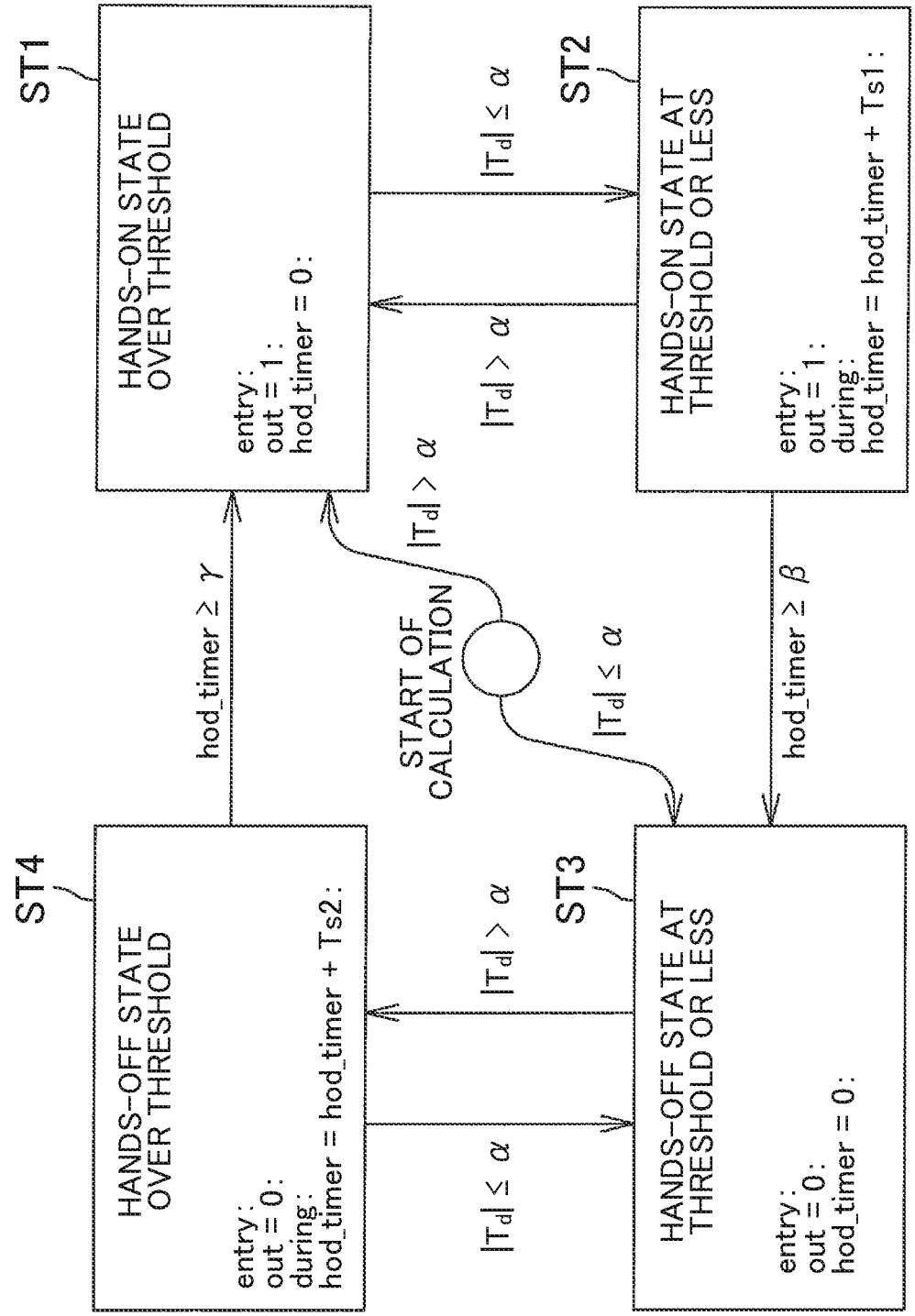
FIG. 10 is a state transition diagram for describing operations of a hands-on/off determination unit.

Next, the hands-on/off determination unit 52 is described. FIG. 10 is a state transition diagram for describing operations of the hands-on/off determination unit 52. As the driver's steering wheel operation state, the hands-on/off determination unit 52 identifies four states, which are a "hands-on state over threshold (ST1)", a "hands-on state at threshold or less (ST2)", a "hands-off state at threshold or less (ST3)", and a "hands-off state over threshold (ST4)".

The "hands-on state over threshold (ST1)" is a hands-on state in which the absolute value of the driver torque $T_d$ is larger than a predetermined threshold α (>0). The "hands-on state at threshold or less (ST2)" is a hands-on state in which the absolute value of the driver torque $T_d$ is equal to or smaller than the threshold $\alpha$. The "hands-off state at threshold or less (ST3)" is a hands-off state in which the absolute value of the driver torque $T_d$ is equal to or smaller than the threshold $\alpha$. The "hands-off state over threshold (ST4)" is a hands-off state in which the absolute value of the driver torque $T_d$ is larger than the threshold $\alpha$. For example, the threshold $\alpha$ is set to a value within a range of 0.1 [Nm] or larger and 0.3 [Nm] or smaller.

When the absolute value of the driver torque $T_d$ is larger than the threshold $\alpha$ at the start of calculation, the hands-on/off determination unit 52 determines that the steering wheel operation state is the "hands-on state over threshold (ST1)". Then, the hands-on/off determination unit 52 sets an output signal (out) to "1", and sets a time counter value hod_timer to 0. The output signal (out) indicates a determination result. A value "1" indicates that the determination result shows "hands-on", and a value "0" indicates that the determination result shows "hands-off".

When the absolute value of the driver torque $T_d$ is equal to or smaller than the threshold $\alpha$ in the "hands-on state over threshold (ST1)", the hands-on/off determination unit 52 determines that the steering wheel operation state is the "hands-on state at threshold or less (ST2)". Then, the hands-on/off determination unit 52 sets the output signal (out) to "1". When the hands-on/off determination unit 52 determines that the steering wheel operation state is the "hands-on state at threshold or less (ST2)", the hands-on/off determination unit 52 updates the time counter value hod_timer to a value obtained by adding a predetermined time Ts1 [sec] to the current value (hod_timer) every time Ts1 elapses.

When the absolute value of the driver torque $T_d$ is larger than the threshold $\alpha$ in the "hands-on state at threshold or less (ST2)" before the time counter value hod_timer reaches a predetermined hands-off determination threshold $\beta$ (>0), the hands-on/off determination unit 52 determines that the steering wheel operation state is the "hands-on state over threshold (ST1)", and sets the time counter value hod_timer to 0.

When the absolute value of the driver torque $T_d$ is not larger than the threshold $\alpha$ and the time counter value hod_timer reaches the hands-off determination threshold $\beta$ in the "hands-on state at threshold or less (ST2)", the hands-on/off determination unit 52 determines that the steering wheel operation state is the "hands-off state at threshold or less (ST3)". Then, the hands-on/off determination unit 52 sets the output signal (out) to "0", and sets the time counter value hod_timer to 0. For example, the hands-off determination threshold $\beta$ is set to a value within a range of 0.5 [sec] or larger and 1.0 [sec] or smaller.

When the absolute value of the driver torque $T_d$ is larger than the threshold $\alpha$ in the "hands-off state at threshold or less (ST3)", the hands-on/off determination unit 52 determines that the steering wheel operation state is the "hands-off state over threshold (ST4)", and sets the output signal (out) to "0". When the hands-on/off determination unit 52 determines that the steering wheel operation state is the "hands-off state over threshold (ST4)", the hands-on/off determination unit 52 updates the time counter value hod_timer to a value obtained by adding a predetermined time Ts2 [sec] to the current value (hod_timer) every time Ts2 elapses. The value of Ts2 may be identical to or different from the value of Ts1.

When the absolute value of the driver torque $T_d$ is equal to or smaller than the threshold $\alpha$ in the "hands-off state over threshold (ST4)" before the time counter value hod_timer reaches a predetermined hands-on determination threshold $\gamma$ (>0), the hands-on/off determination unit 52 determines that the steering wheel operation state is the "hands-off state at threshold or less (ST3)". Then, the hands-on/off determination unit 52 sets the time counter value hod_timer to 0. For example, the hands-on determination threshold $\gamma$ is set to a value within a range of 0.05 [sec] or larger and 0.1 [see] or smaller.

When the absolute value of the driver torque $T_d$ is not equal to or smaller than the threshold $\alpha$ and the time counter value hod_timer reaches the hands-on determination threshold $\gamma$ in the "hands-off state over threshold (ST4)", the hands-on/off determination unit 52 determines that the steering wheel operation state is the "hands-on state over threshold (ST1)". Then, the hands-on/off determination unit 52 sets the output signal (out) to "1", and sets the time counter value hod_timer to 0.

When the absolute value of the driver torque $T_d$ is equal to or smaller than the threshold $\alpha$ at the start of calculation, the hands-on/off determination unit 52 determines that the steering wheel operation state is the "hands-off state at threshold or less (ST3)". Then, the hands-on/off determination unit 52 sets the output signal (out) to "0", and sets the time counter value hod_timer to 0. In the embodiment described above, the driver torque $T_d$ is calculated in consideration of the gravity torque $T_g$ applied to the first shaft 8 by the gravity acting on the center of gravity G of the steering wheel 2. Thus, the driver torque can be estimated with high accuracy. In this configuration, the driver torque $T_d$ is calculated in consideration of not only the gravity torque $T_g$ but also the Coulomb friction torque $T_f$ acting on the first shaft 8 and the steering wheel 2. Thus, the driver torque can be estimated with higher accuracy.

In the embodiment described above, the hands-on/off determination is made by using the torque threshold $\alpha$ and the time counter value hod_timer based on the highly accurate driver torque $T_d$ estimated by the driver torque estimation unit 51. Thus, determination can be made with high accuracy as to whether the steering wheel operation state is the hands-on state in which the driver is gripping the steering wheel 2 or the hands-off state in which the driver is not gripping the steering wheel 2.

For example, the hands-on/off determination results can be used for mode switching control in a vehicle having an automatic driving mode and a manual driving mode prepared as driving modes, as typified by a case where the driving mode is switched from the automatic driving mode to the manual driving mode after confirming that the steering wheel operation state is the hands-on state. Although the first embodiment of the present invention is described above, the present invention may be carried out based on other embodiments. For example, in the embodiment described above, the steering wheel rotation angle $\theta_{sw}$ estimated by the extended state observer 62 is used for calculating the gravity torque $T_g$ by the gravity torque calculation unit 63. The steering wheel angular velocity $d\theta_{sw}/dt$ estimated by the extended state observer 62 is used for calculating the Coulomb friction torque $T_f$ by the friction torque calculation unit 64. A steering angle sensor configured to detect the rotation angle of the steering wheel 2 may be provided, and a steering wheel rotation angle $\theta_{sw}$ detected by the steering angle sensor may be used for calculating the gravity torque $T_g$ by the gravity torque calculation unit 63. A steering wheel angular velocity $d\theta_{sw}/dt$ obtained by determining a time derivative of the steering wheel rotation angle $\theta_{sw}$ detected by the steering angle sensor may be used for calculating the Coulomb friction torque $T_f$ by the friction torque calculation unit 64.

In the embodiment described above, the electric motor 18 is the three-phase brushless motor, but may be a brushed direct current (DC) motor. The embodiment described above is directed to the case where the present invention is applied to the column type EPS. The present invention is also applicable to a pinion assist type EPS in which the assist electric motor 18 is coupled to the pinion shaft 13 via a speed reducer. In this case as well, the model of FIG. 4 can be used, whereby the driver torque $T_d$ can be estimated by a method similar to that of the embodiment described above.

In the pinion assist type EPS, an electric motor, a speed reducer, a torque sensor, and a torsion bar are provided on a pinion shaft. For example, the speed reducer is constituted by a worm gear to be rotated by the electric motor, and a worm wheel that is provided on the pinion shaft and meshes with the worm gear. The torsion bar is provided on the pinion shaft at a part closer to the steering wheel with respect to the worm wheel. A worm wheel rotation angle (rotation angle of the pinion shaft) is calculated based on a signal from a rotation angle sensor configured to detect a rotor rotation angle of the electric motor. A pinion shaft rotation angle sensor configured to detect the rotation angle of the pinion shaft may be provided on the pinion shaft at a part closer to the worm wheel with respect to the torsion bar, and the rotation angle of the pinion shaft may be calculated based on a signal from the pinion shaft rotation angle sensor. The steering shaft is not provided with a torsion bar or a speed reducer.

In the case of the pinion assist type EPS having the structure described above, the physical model may be illustrated in FIG. 4 irrespective of the number of electric motors or the structure of the speed reducer (worm gear mechanism, ball screw mechanism, or speed reducing belt mechanism). This is because the rigidities of the intermediate shaft, the universal joints, and the steering shaft provided closer to the steering wheel with respect to the torsion bar are sufficiently higher than the torsion bar rigidity illustrated in FIG. 4 in general. In the pinion assist type EPS having the structure described above, the driver torque can be estimated with high accuracy similarly to the embodiment described above.

Figure 11:
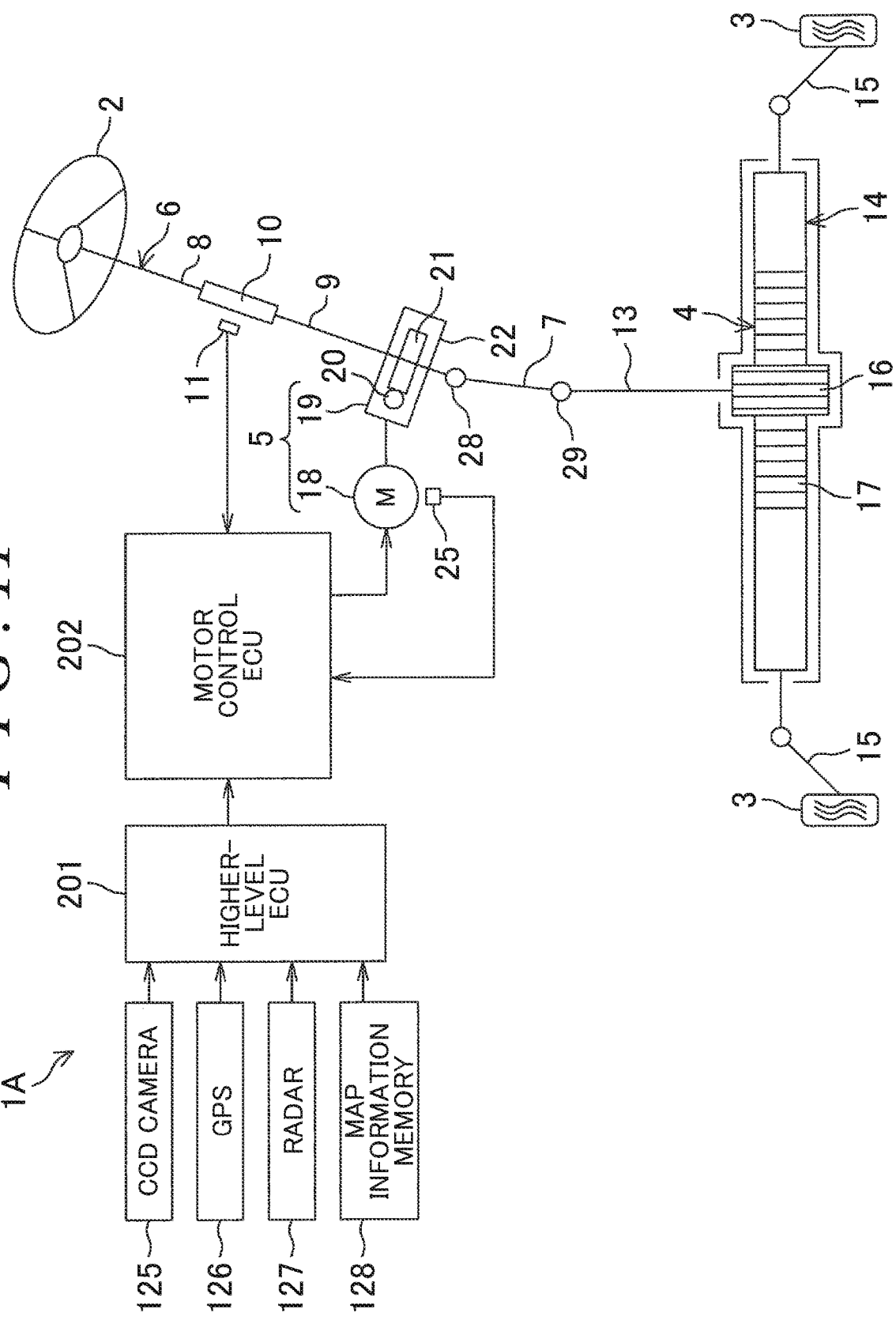
FIG. 11 is a schematic diagram illustrating the overall structure of an electric power steering system to which a steering system according to one embodiment of the present invention is applied.

Next, a second embodiment of the present invention is described. FIG. 11 is a schematic diagram illustrating the overall structure of an electric power steering system to which a steering system according to one embodiment of the present invention is applied. In FIG. 11, parts corresponding to the parts of FIG. 1 are represented by the same reference symbols. The mechanical structure of an electric power steering system 1A of FIG. 11 is similar to the mechanical structure of the electric power steering system 1 of FIG. 1, and therefore description is omitted.

A charge coupled device (CCD) camera 125, a global positioning system (GPS) 126, a radar 127, and a map information memory 128 are mounted on a vehicle. The CCD camera 125 photographs a road in front of the vehicle in its traveling direction. The GPS 126 detects the position of the vehicle itself. The radar 127 detects a road shape and an obstacle. The map information memory 128 stores map information.

The CCD camera 125, the GPS 126, the radar 127, and the map information memory 128 are connected to a higher-level electronic control unit (ECU) 201 configured to perform automatic assist control or automatic driving control. For example, the higher-level ECU 201 recognizes a surrounding environment, estimates the position of the vehicle itself, and performs route planning based on information obtained by the CCD camera 125, the GPS 126, and the radar 127 and also based on the map information, and performs steering and determines a target control value of a drive actuator.

In this embodiment, the higher-level ECU 201 sets an automatic steering command value $\theta_{adac}$ for automatic steering. In this embodiment, automatic steering control is, for example, control for causing the vehicle to travel along a target track. The automatic steering command value $\theta_{adac}$ is a target value of a steering angle for causing the vehicle to automatically travel along the target track. Processing for setting the automatic steering command value $\theta_{adac}$ is well known, and therefore detailed description is omitted herein.

The automatic steering command value $\theta_{adac}$ set by the higher-level ECU 201 is supplied to a motor control ECU 202 via an on-board network. The torque sensor 11, the rotation angle sensor 25, and the like are connected to the motor control ECU 202 in addition to the higher-level ECU 201. The torque sensor 11 detects the torsion bar torque $T_{tb}$ applied to the torsion bar 10 based on a relative rotation displacement amount between the first shaft 8 and the second shaft 9. The rotation angle sensor 25 detects the rotation angle of the rotor of the electric motor 18 (hereinafter referred to as "rotor rotation angle"). The motor control ECU 202 controls the electric motor 18 based on signals output from the sensors and information supplied from the higher-level ECU 201.

Figure 12:
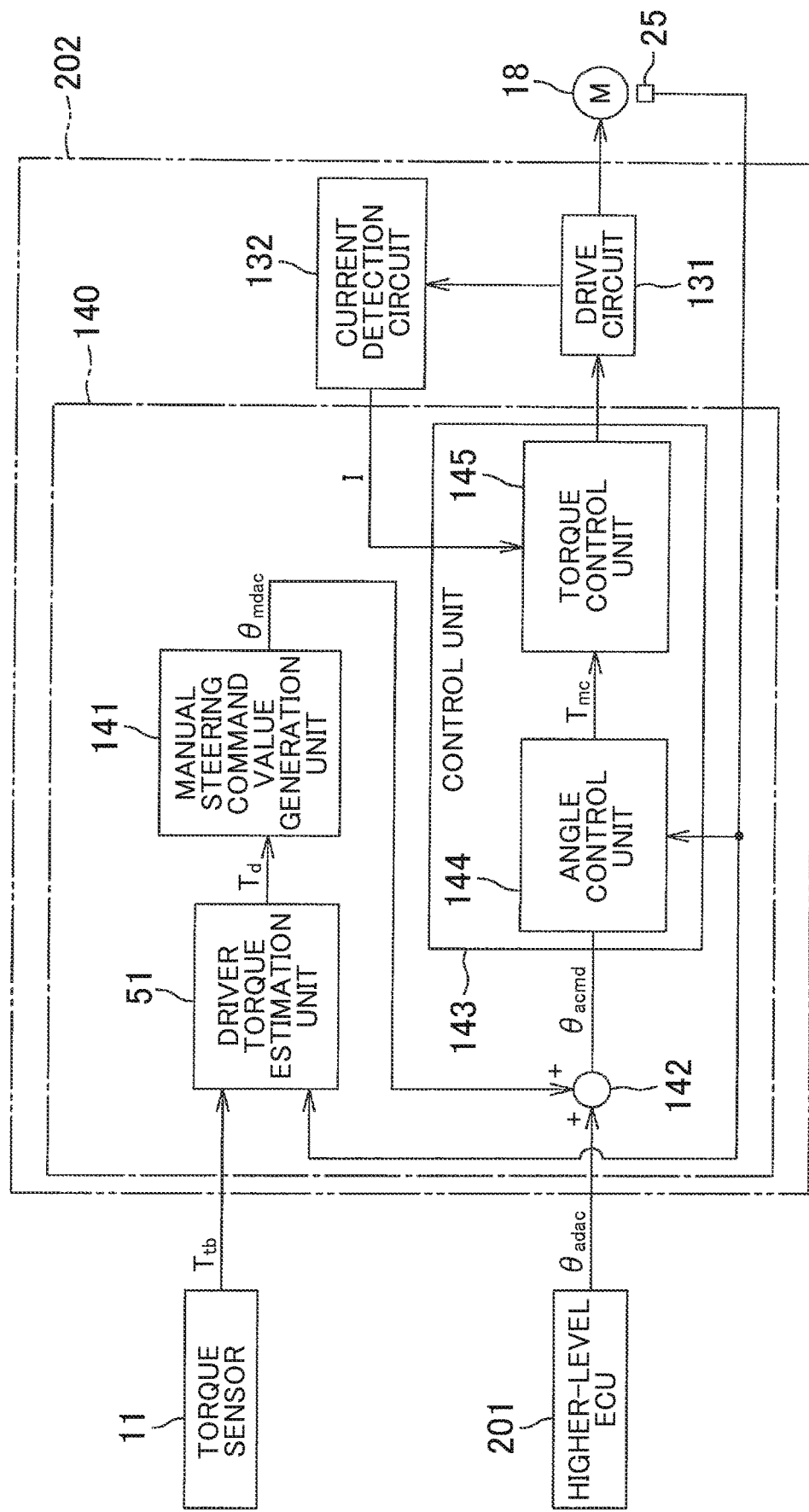
FIG. 12 is a block diagram for describing the electrical configuration of a motor control ECU.

FIG. 12 is a block diagram for describing the electrical configuration of the motor control ECU 202. The motor control ECU 202 includes a microcomputer 140, a drive circuit (inverter circuit) 131, and a current detection circuit 132. The drive circuit (inverter circuit) 131 is controlled by the microcomputer 140, and supplies electric power to the electric motor 18. The current detection circuit 132 detects a current flowing through the electric motor 18 (hereinafter referred to as "motor current I").

The microcomputer 140 includes a CPU and memories (such as a ROM, a RAM, and a non-volatile memory), and functions as a plurality of functional processing units by executing a predetermined program. The functional processing units include the driver torque estimation unit 51, a manual steering command value generation unit 141, an integrated angle command value calculation unit 142, and a control unit 143.

The driver torque estimation unit 51 estimates the driver torque $T_d$ based on the signal output from the rotation angle sensor 25 and the torsion bar torque $T_{tb}$ detected by the torque sensor 11. The configuration of the driver torque estimation unit 51 is similar to that of the driver torque estimation unit 51 of FIG. 3, and therefore detailed description is omitted. The manual steering command value generation unit 141 is provided in order to set, as a manual steering command value $\theta_{mdac}$, a steering angle (more exactly, a rotation angle θ of the second shaft 9) in response to a driver's steering wheel operation of the steering wheel 2. The manual steering command value generation unit 141 generates the manual steering command value $\theta_{mdac}$ by using the driver torque $T_d$ estimated by the driver torque estimation unit 51. Details of the manual steering command value generation unit 141 are described later.

The integrated angle command value calculation unit 142 calculates an integrated angle command value $\theta_{acmd}$ by adding the manual steering command value $\theta_{mdac}$ to the automatic steering command value $\theta_{adac}$ set by the higher-level ECU 201.

The control unit 143 performs angle control for the electric motor 18 based on the integrated angle command value $\theta_{acmd}$. More specifically, the control unit 143 controls driving of the drive circuit 131 so that the steering angle θ (rotation angle θ of the second shaft 9) approaches the integrated angle command value $\theta_{acmd}$.

For example, the control unit 143 includes an angle control unit 144 and a torque control unit (current control unit) 145. The angle control unit 144 performs proportional-derivative (PD) calculation for a deviation between the integrated angle command value $\theta_{acmd}$ and the steering angle θ calculated based on the signal output from the rotation angle sensor 25. Thus, a motor torque command value $T_{mc}$ is calculated. The motor torque command value $T_{mc}$ is a target value of the motor torque of the electric motor 18. For example, the torque control unit 145 first calculates a current command value $I_{cmd}$ by dividing the motor torque command value $T_{mc}$ by a torque constant $K_t$ of the electric motor 18. Then, the torque control unit 145 drives the drive circuit 131 so that the value of the motor current I detected by the current detection circuit 132 approaches the current command value $I_{cmd}$.

Figure 13:
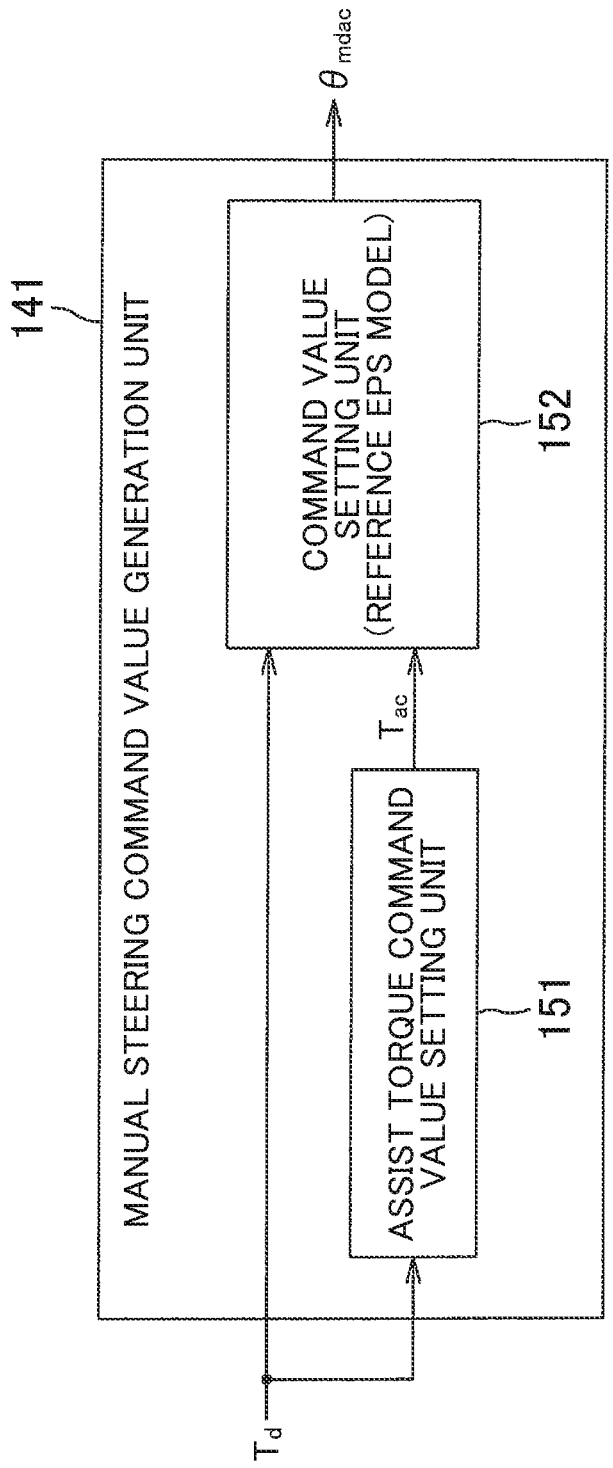
FIG. 13 is a block diagram illustrating the configuration of a manual steering command value generation unit of FIG. 12.

FIG. 13 is a block diagram illustrating the configuration of the manual steering command value generation unit 141. The manual steering command value generation unit 141 includes an assist torque command value setting unit 151 and a command value setting unit 152.

Figure 14:
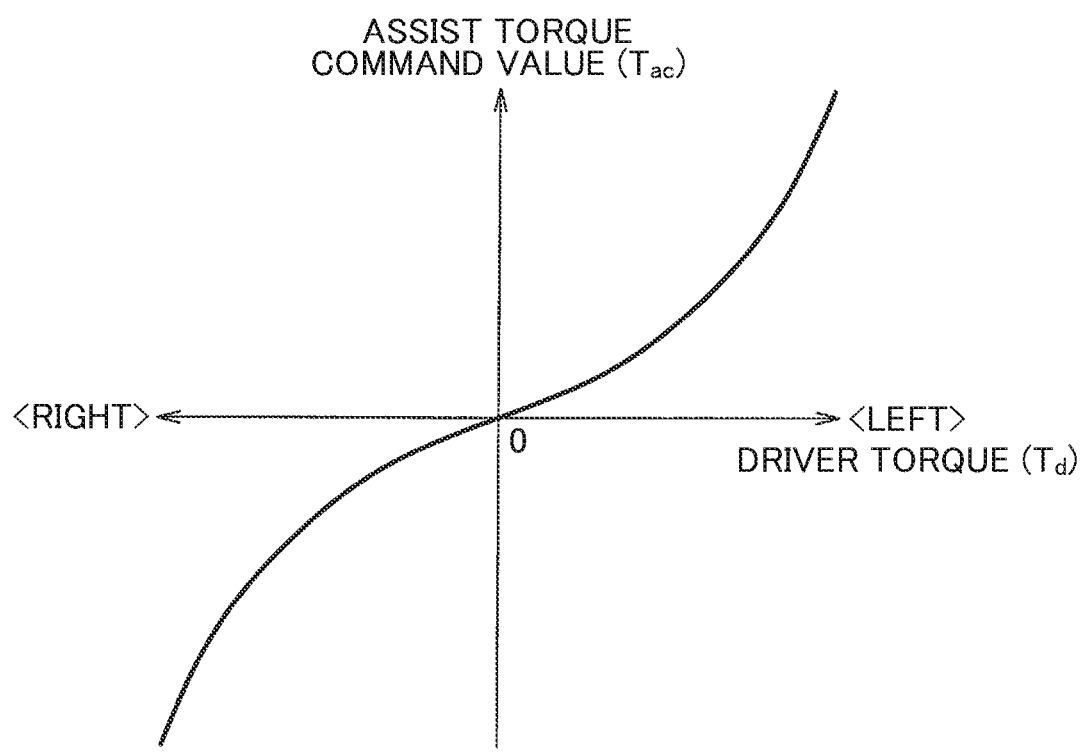
FIG. 14 is a graph illustrating a setting example of an assist torque command value $T_{ac}$ with respect to a driver torque $T_d$.

The assist torque command value setting unit 151 sets an assist torque command value $T_{ac}$ that is a target value of an assist torque necessary for manual steering. The assist torque command value setting unit 151 sets the assist torque command value $T_{ac}$ based on the driver torque $T_d$ estimated by the driver torque estimation unit 51. FIG. 14 illustrates a setting example of the assist torque command value $T_{ac}$ with respect to the driver torque $T_d$. For example, the driver torque $T_d$ takes a positive value as a torque for steering in a leftward direction, and takes a negative value as a torque for steering in a rightward direction. The assist torque command value $T_{ac}$ takes a positive value when the electric motor 18 is caused to generate a steering assist force for steering in the leftward direction, and takes a negative value when the electric motor 18 is caused to generate a steering assist force for steering in the rightward direction.

The assist torque command value $T_{ac}$ takes a positive value when the driver torque $T_d$ takes a positive value. The assist torque command value $T_{ac}$ takes a negative value when the driver torque $T_d$ takes a negative value. The absolute value of the assist torque command value $T_{ac}$ is set to increase as the absolute value of the driver torque $T_d$ increases.

The assist torque command value setting unit 151 may calculate the assist torque command value $T_{ac}$ by multiplying the driver torque $T_d$ by a constant set in advance.

Figure 15:
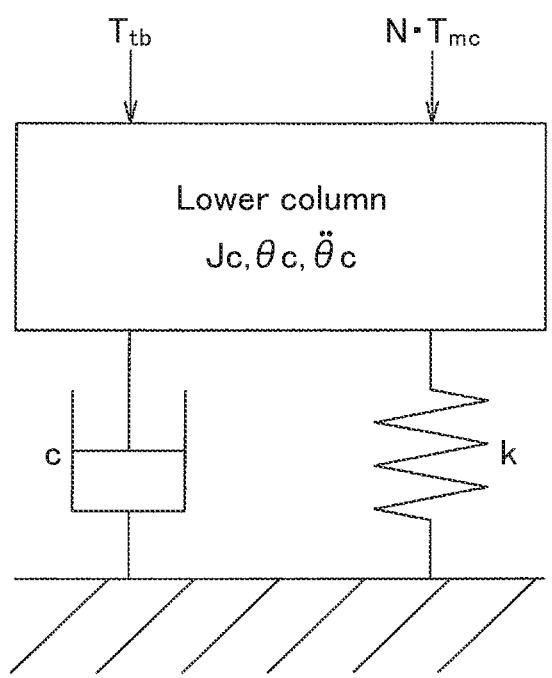
FIG. 15 is a schematic diagram illustrating an example of a reference EPS model to be used in a command value setting unit.

In this embodiment, the command value setting unit 152 sets the manual steering command value $\theta_{mdac}$ by using a reference EPS model. FIG. 15 is a schematic diagram illustrating an example of the reference EPS model to be used in the command value setting unit 152. The reference EPS model is a single inertia model including a lower column. The lower column corresponds to the second shaft 9 and the worm wheel 21. In FIG. 15, "$J_c$" represents inertia of the lower column, "$\theta_c$" represents a rotation angle of the lower column, and "$T_{tb}$" represents the torsion bar torque. The torsion bar torque $T_{tb}$, a torque $N \cdot T_{mc}$, and a road load torque $T_{rl}$ are applied to the lower column. The torque $N \cdot T_{mc}$ acts on the second shaft 9 from the electric motor 18. The road load torque $T_{rl}$ is represented by Expression (15) by using a spring rate k and a viscous damping coefficient c.

$$T_{rl} = -k \cdot \theta_c - c(d\theta_c/dt) \quad (15)$$

In this embodiment, predetermined values obtained in advance through an experiment, analysis, and the like are set as the spring rate k and the viscous damping coefficient c. An equation of motion of the reference EPS model is represented by Expression (16).

$$J_c \cdot d^2\theta_c/dt^2 = T_{tb} + N \cdot T_{mc} - k \cdot \theta_c - c(d\theta_c/dt) \quad (16)$$

The command value setting unit 152 sets the manual steering command value $\theta_{mdac}$ by using Expression (16). At this time, the assist torque command value $T_{ac}$ set by the assist torque command value setting unit 151 (see FIG. 13) is used as $N \cdot T_{mc}$.

The column angle $\theta_c$ is calculated by substituting the torsion bar torque $T_{tb}$ detected by the torque sensor 11 as $T_{tb}$ of Expression (16) and solving the differential equation of Expression (16). The obtained column angle $\theta_C$ may be set as the manual steering command value $\theta_{mdac}$. However, the torsion bar torque $T_{tb}$ detected by the torque sensor 11 also includes a disturbance other than the driver torque actually applied to the steering wheel 2 by the driver. When the manual steering command value $\theta_{mdac}$ is calculated by substituting the torsion bar torque $T_{tb}$ as $T_{tb}$ of Expression (16), the manual steering command value $\theta_{mdac}$ may be set based on the disturbance other than the driver torque even while the driver is not operating the steering wheel 2.

In this embodiment, the command value setting unit 152 calculates the column angle $\theta_c$ by substituting the driver torque $T_d$ estimated by the driver torque estimation unit 51 as $T_{tb}$ of Expression (16) and solving the differential equation of Expression (16). Then, the command value setting unit 152 sets the obtained column angle $\theta_c$ as the manual steering command value $\theta_{mdac}$. Thus, it is possible to reduce the occurrence of the case where the manual steering command value $\theta_{mdac}$ is set based on the disturbance other than the driver torque while the driver is not operating the steering wheel 2.

In the electric power steering system 1A of FIG. 11, the integrated angle command value is calculated by adding the manual steering command value to the automatic steering command value, and the electric motor 18 is controlled based on the integrated angle command value. Therefore, it is possible to achieve cooperative control in which manual steering can be performed while mainly performing the automatic steering control without switching between the manual steering control and the automatic steering control. Thus, the switching between the manual steering control and the automatic steering control can be made seamlessly. Accordingly, driver's discomfort can be reduced.

Figure 16:
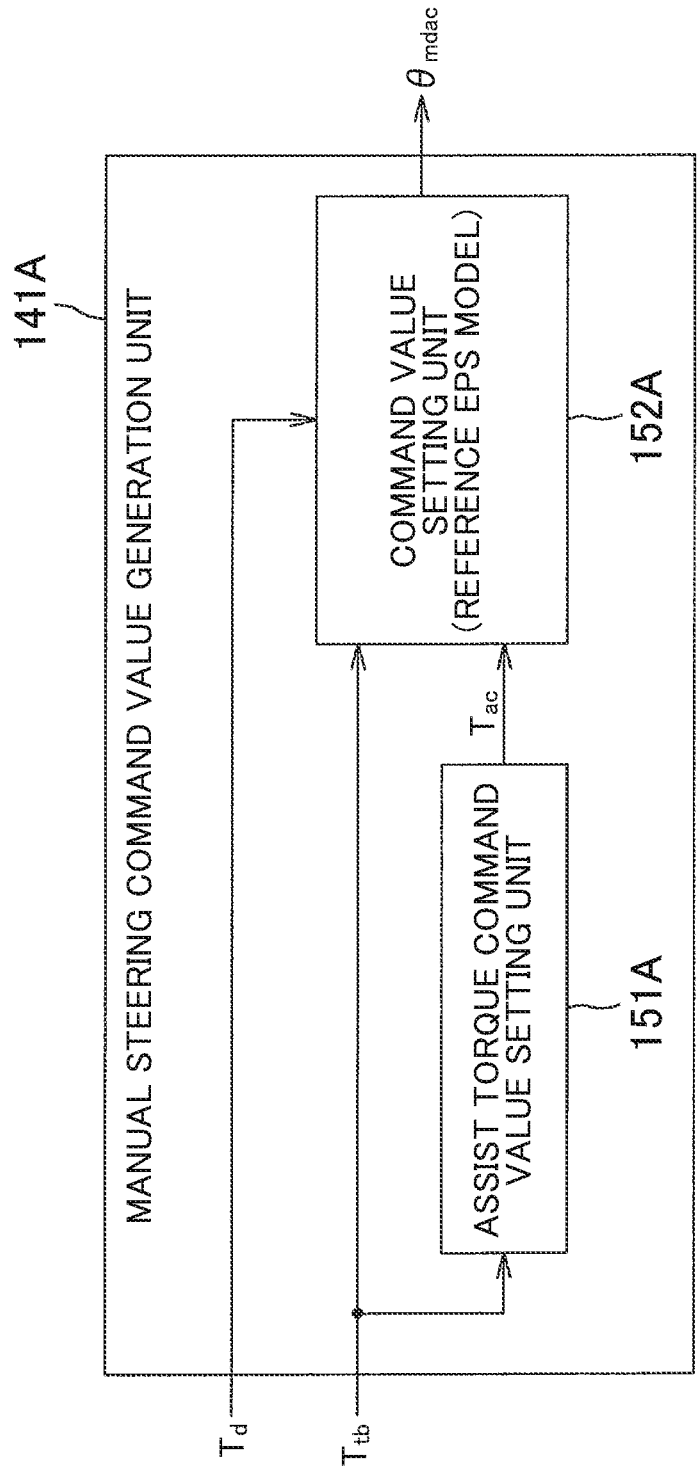
FIG. 16 is a block diagram illustrating a modified example of the manual steering command value generation unit.

In the electric power steering system 1A of FIG. 11, it is possible to reduce, as described above, the occurrence of the case where the manual steering command value $\theta_{mdac}$ is set based on the disturbance other than the driver torque while the driver is not operating the steering wheel 2. FIG. 16 is a block diagram illustrating a modified example of the manual steering command value generation unit of FIG. 13. A manual steering command value generation unit 141A includes an assist torque command value setting unit 151A and a command value setting unit 152A. The torsion bar torque $T_{tb}$ detected by the torque sensor 11 and an assist torque command value $T_{ac}$ set by the assist torque command value setting unit 151A are input to the command value setting unit 152A. The assist torque command value setting unit 151A sets the assist torque command value $T_{ac}$ based on the torsion bar torque $T_{tb}$ detected by the torque sensor 11. A setting example in which the driver torque $T_d$ on the horizontal axis of FIG. 14 is replaced with the torsion bar torque $T_{tb}$ may be used as a setting example of the assist torque command value $T_{ac}$ with respect to the torsion bar torque $T_{tb}$. The driver torque $T_d$ estimated by the driver torque estimation unit 51 is supplied to the command value setting unit 152A.

When an absolute value $|T_d|$ of the driver torque $T_d$ is equal to or larger than a predetermined threshold $\phi$ ($\phi$>0), the command value setting unit 152A substitutes the torsion bar torque $T_{tb}$ and the assist torque command value $T_{ac}$ input to the command value setting unit 152A as $T_{tb}$ and $N \cdot T_{mc}$ of Expression (16), respectively, and solves the differential equation of Expression (16). Thus, the manual steering command value $\theta_{mdac}$ (=$\theta_c$) is set. When the absolute value $|T_d|$ of the driver torque $T_d$ is smaller than the threshold $\phi$, the manual steering command value $\theta_{mdac}$ (=$\theta_c$) is set by substituting 0 as $T_{tb}$ and $N \cdot T_{mc}$ of Expression (16) and solving the differential equation of Expression (16).

The manual steering command value generation unit 141A sets the manual steering command value $\theta_{mdac}$ by using the torsion bar torque $T_{tb}$. When the absolute value $|T_d|$ of the driver torque $T_d$ is smaller than the threshold $\phi$, the torsion bar torque $T_{tb}$ input to the manual steering command value generation unit 141A is substantially set to 0. Thus, it is possible to reduce the occurrence of the case where the manual steering command value $\theta_{mdac}$ is set based on the disturbance other than the driver torque while the driver is not operating the steering wheel 2. The manual steering command value $\theta_{mdac}$ is set by using the torsion bar torque $T_{tb}$. Thus, a time lag of the manual steering command value $\theta_{mdac}$ with respect to the driver's steering wheel operation can be reduced as compared to the case of using the driver torque $T_d$ estimated by the driver torque estimation unit 51.

Figure 17:
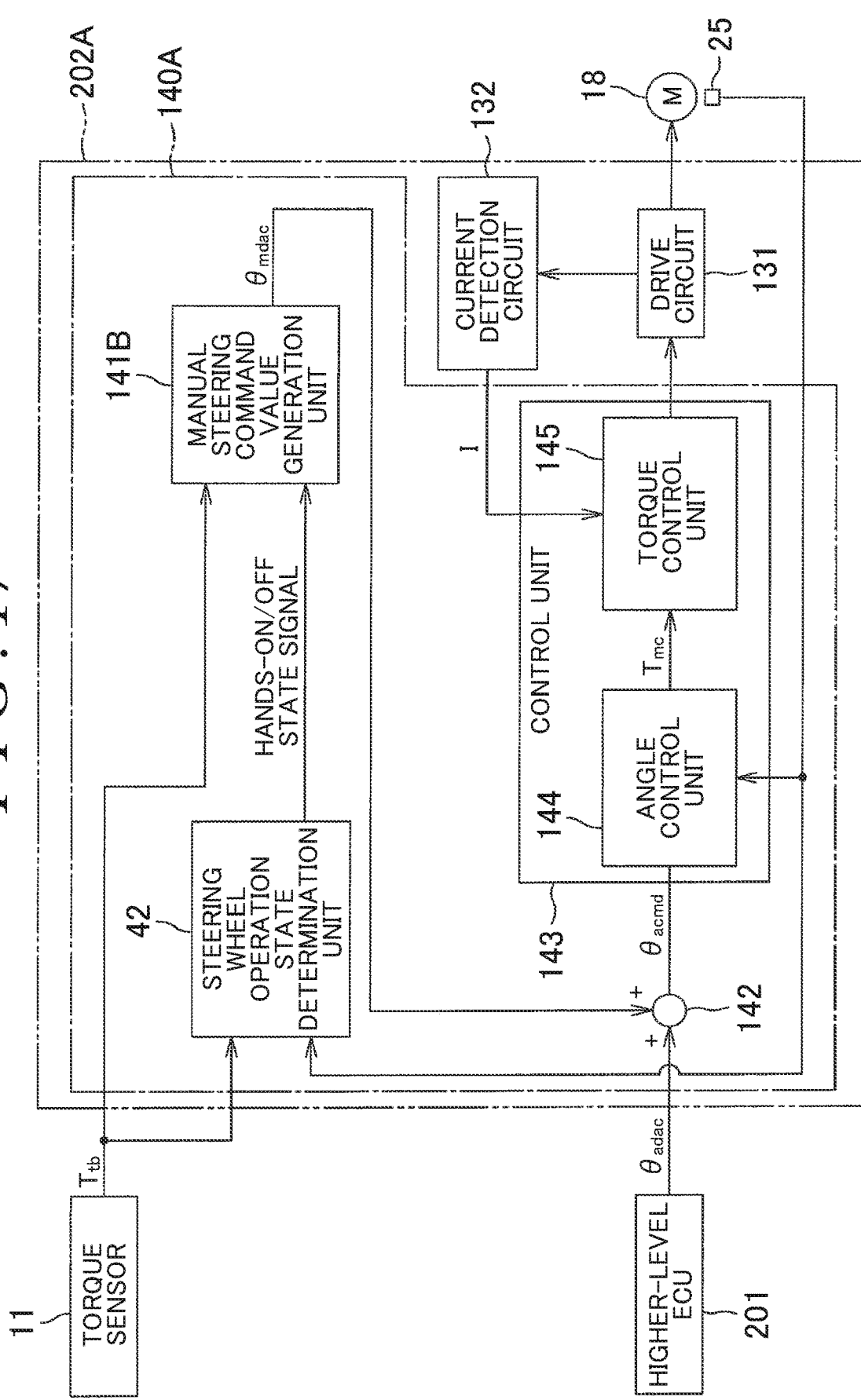
FIG. 17 is a block diagram illustrating a modified example of the motor control ECU.

FIG. 17 is a block diagram illustrating a modified example of the motor control ECU of FIG. 12. In FIG. 17, parts corresponding to the parts of FIG. 12 are represented by the same reference symbols as those of FIG. 12. A motor control ECU 202A differs from the motor control ECU 202 of FIG. 12 in terms of the configuration of functional processing units implemented by a CPU of a microcomputer 140A. The microcomputer 140A includes the steering wheel operation state determination unit 42, a manual steering command value generation unit 141B, the integrated angle command value calculation unit 142, and the control unit 143 as the functional processing units.

The steering wheel operation state determination unit 42 determines, based on the signal output from the rotation angle sensor 25 and the torsion bar torque $T_{tb}$, whether the steering wheel operation state is the hands-on state in which the driver is gripping the steering wheel or the hands-off state in which the driver is not gripping the steering wheel. The configuration of the steering wheel operation state determination unit 42 is similar to that of the steering wheel operation state determination unit 42 of FIG. 2 and FIG. 3, and therefore detailed description is omitted. When the steering wheel operation state determination unit 42 determines that the steering wheel operation state is the hands-on state, the steering wheel operation state determination unit 42 outputs a hands-on state signal. When the steering wheel operation state determination unit 42 determines that the steering wheel operation state is the hands-off state, the steering wheel operation state determination unit 42 outputs a hands-off state signal.

The manual steering command value generation unit 141B generates the manual steering command value $\theta_{mdac}$ by using the signal output from the steering wheel operation state determination unit 42 (hands-on/off state signal) and the torsion bar torque $T_{tb}$ detected by the torque sensor 11.

Details of the manual steering command value generation unit 141B are described later. The integrated angle command value calculation unit 142 calculates the integrated angle command value $\theta_{mdac}$ by adding the manual steering command value $\theta_{mdac}$ to the automatic steering command value $\theta_{adac}$ set by the higher-level ECU 201.

Figure 18:
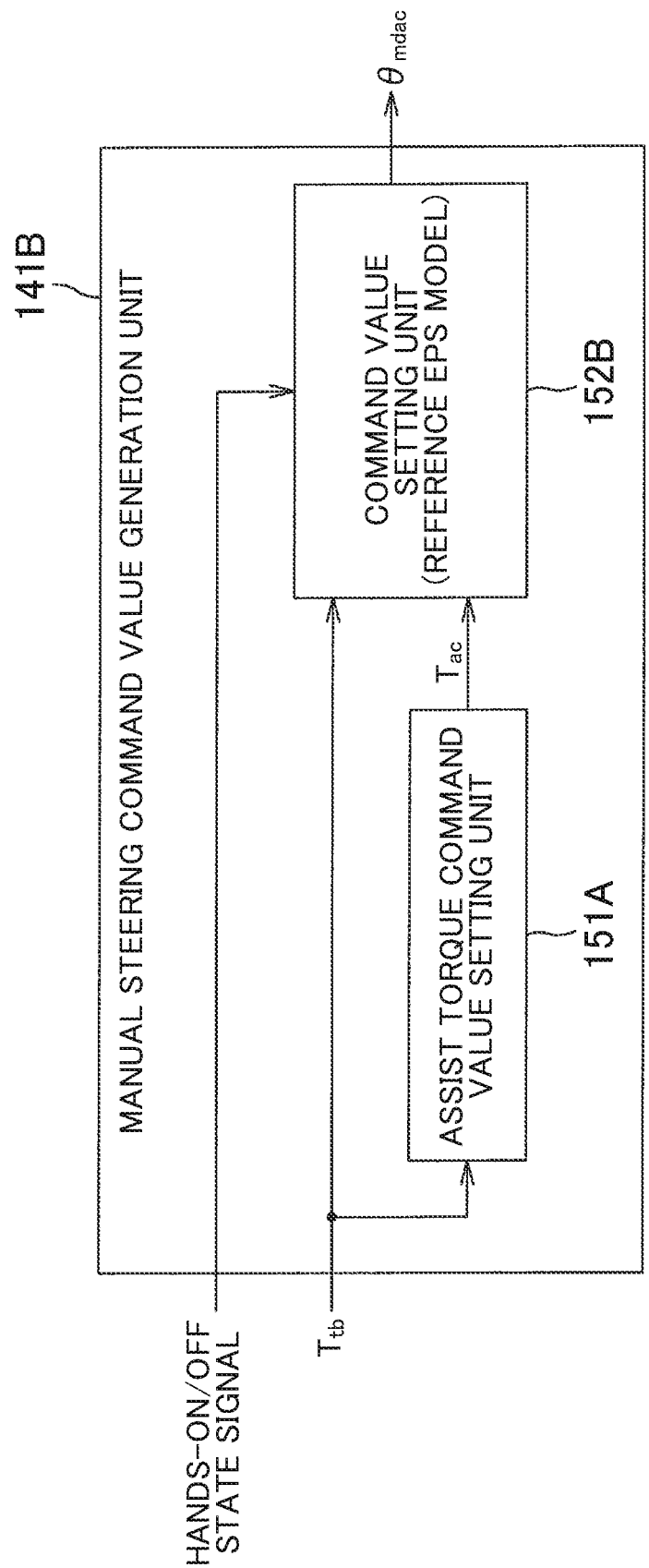
FIG. 18 is a block diagram illustrating the configuration of a manual steering command value generation unit of FIG. 17.

The control unit 143 performs angle control for the electric motor 18 based on the integrated angle command value $\theta_{acmd}$. The configuration of the control unit 143 is similar to that of the control unit 143 of FIG. 12, and therefore detailed description is omitted. FIG. 18 is a block diagram illustrating the configuration of the manual steering command value generation unit 141B. The manual steering command value generation unit 141B includes the assist torque command value setting unit 151A and a command value setting unit 152B.

The assist torque command value setting unit 151A sets the assist torque command value $T_{ac}$ that is the target value of the assist torque necessary for manual steering. The operation of the assist torque command value setting unit 151A is similar to the operation of the assist torque command value setting unit 151A of FIG. 16, and therefore detailed description is omitted. The torsion bar torque $T_{tb}$ detected by the torque sensor 11 and the assist torque command value $T_{ac}$ set by the assist torque command value setting unit 151A are input to the command value setting unit 152B. The signal output from the steering wheel operation state determination unit 42 (hands-on/off state signal) is supplied to the command value setting unit 152B.

When the signal output from the steering wheel operation state determination unit 42 is the hands-on state signal, the command value setting unit 152B substitutes the torsion bar torque $T_{tb}$ and the assist torque command value $T_{ac}$ input to the command value setting unit 152B as $T_{tb}$ and $N \cdot T_{mc}$ of Expression (16), respectively, and solves the differential equation of Expression (16). Thus, the manual steering command value $\theta_{mdac}$ (=$\theta_c$) is set. When the signal output from the steering wheel operation state determination unit 42 is the hands-off state signal, the command value setting unit 152B substitutes 0 as $T_{tb}$ and $N \cdot T_{mc}$ of Expression (16), and solves the differential equation of Expression (16). Thus, the manual steering command value $\theta_{mdac}$ (=$\theta_c$) is set.

The manual steering command value generation unit 141B sets the manual steering command value $\theta_{mdac}$ by using the torsion bar torque $T_{tb}$. When the signal output from the steering wheel operation state determination unit 42 is the hands-off state signal, the torsion bar torque $T_{tb}$ input to the manual steering command value generation unit 141B is substantially set to 0. Thus, it is possible to reduce the occurrence of the case where the manual steering command value $\theta_{mdac}$ is set based on the disturbance other than the driver torque while the driver is not operating the steering wheel 2. The manual steering command value $\theta_{mdac}$ is set by using the torsion bar torque $T_{tb}$. Thus, the time lag of the manual steering command value $\theta_{mdac}$ with respect to the driver's steering wheel operation can be reduced as compared to the case of using the driver torque $T_d$ estimated by the driver torque estimation unit 51.

Although the second embodiment of the present invention is described above, the present invention may be carried out based on other embodiments. For example, in the embodiment described above, the command value setting units 152, 152A, and 152B (see FIG. 13, FIG. 16, and FIG. 18) set the manual steering command value $\theta_{mdac}$ based on the reference EPS model. The command value setting units 152, 152A, and 152B may set the manual steering command value $\theta_{mdac}$ by other methods.

For example, the command value setting units 152, 152A, and 152B may set the manual steering command value $\theta_{mdac}$ by using a map that stores a relationship between the driver torque $T_d$ (in the case of FIG. 13) or the torsion bar torque $T_{tb}$ (in the case of FIG. 16 or FIG. 18) and the manual steering command value $\theta_{mdac}$. The second embodiment described above is directed to the exemplary case where the present invention is applied to the column type EPS. The present invention is also applicable to an EPS other than the column type EPS. The present invention is also applicable to a steer-by-wire system.

Various other design changes may be made to the present invention within the scope of matters described in the claims.

What is claimed is:

1. A driver torque estimation apparatus, comprising:
    a first shaft to which a steering wheel to be used for steering a vehicle is coupled;
    a second shaft coupled to the first shaft via a torsion bar;
    a torque sensor configured to detect a torsion bar torque applied to the torsion bar;
    a rotation angle sensor configured to acquire a rotation angle of the second shaft; and
    an electronic control unit configured to:
        estimate a basic driver torque by using a disturbance observer based on the torsion bar torque and the rotation angle of the second shaft;
        calculate, by using a rotation angle of the steering wheel, a gravity torque applied to the first shaft by gravity acting on a center of gravity of the steering wheel;
        calculate a Coulomb friction torque acting on the steering wheel and the first shaft by using an angular velocity of the steering wheel;
        estimate a driver torque by using the estimated basic driver torque, the calculated gravity torque and the calculated Coulomb friction torque; and
        control a position of the steering wheel based on an application of the estimated driver torque.

2. The driver torque estimation apparatus according to claim 1, wherein the electronic control unit is further configured to:
    estimate the basic driver torque, and also estimate the rotation angle of the steering wheel, and
        calculate the gravity torque by using the estimated rotation angle of the steering wheel.

3. The driver torque estimation apparatus according to claim 1, wherein the electronic control unit is further configured to:
    estimate the basic driver torque, and also estimate the rotation angle of the steering wheel and the angular velocity of the steering wheel,
    calculate the gravity torque by using the estimated rotation angle of the steering wheel; and
    calculate the Coulomb friction torque by using the estimated angular velocity of the steering wheel.

4. The driver torque estimation apparatus according to claim 1, wherein
    when an angle formed by a vertical line passing through a center-of-rotation position of the steering wheel with respect to a rotational plane of the steering wheel is defined as a steering wheel inclination angle, and an angle determined based on a rotation amount and a rotation direction of the steering wheel from a neutral position that is a position of the steering wheel at which a direction of the vehicle is a straightforward direction is defined as a steering wheel rotation angle,
    the electronic control unit is configured to calculate, as the gravity torque, a product of a distance between a center-of-gravity position and the center-of-rotation position of the steering wheel, a mass of the steering wheel, a sine value of the steering wheel rotation angle, and a cosine value of the steering wheel inclination angle.

* * * * *